United States Patent
Metcalfe et al.

[15] 3,644,698
[45] Feb. 22, 1972

[54] METALLURGICAL BONDING AND FORMING PROCESSES AND APPARATUS

[72] Inventors: Arthur G. Metcalfe, San Diego; Fred K. Rose, Chula Vista, both of Calif.

[73] Assignee: International Harvester Company, San Diego, Calif.

[22] Filed: Sept. 8, 1969

[21] Appl. No.: 856,526

[52] U.S. Cl. ..............................219/83, 219/117, 219/118
[51] Int. Cl. ..............................................................B23k 11/06
[58] Field of Search ..............................219/83, 91, 117, 118

[56] References Cited

UNITED STATES PATENTS

| | | | |
|---|---|---|---|
| 3,036,200 | 5/1962 | Keefe | 219/92 |
| 3,443,055 | 5/1969 | Gwynn et al. | 219/83 |

FOREIGN PATENTS OR APPLICATIONS

| | | | |
|---|---|---|---|
| 199,653 | 8/1967 | U.S.S.R. | 219/121 |

Primary Examiner—J. V. Truhe
Assistant Examiner—J. G. Smith
Attorney—Strauch, Nolan, Neale, Nies & Kurz

[57] ABSTRACT

Methods of and apparatus for forming a continuous solid-state diffusion bond between metallic members in which the members to be joined are locally and progressively subjected to heat and pressure. Heating is achieved by workpiece resistance to controlled electrical current, and pressure is applied by rotatable electrodes that: generate contact between the members being joined and produce the deformation necessary to achieve a specified joint configuration therebetween; supply the controlled electric current to heat the workpiece locally and progressively; and are maintained at a temperature which results in essentially isothermal local conditions in the workpiece. Preferably, controls capable of regulating the bonding temperature are provided to insure that a uniform joint is produced. Methods of and apparatus for forming metallic members with and without bond formation by the techniques just described.

17 Claims, 40 Drawing Figures

INVENTORS
ARTHUR G. METCALFE
FRED K. ROSE
BY
Strauch, Nolan, Neale,
Nies & Kurz
ATTORNEYS

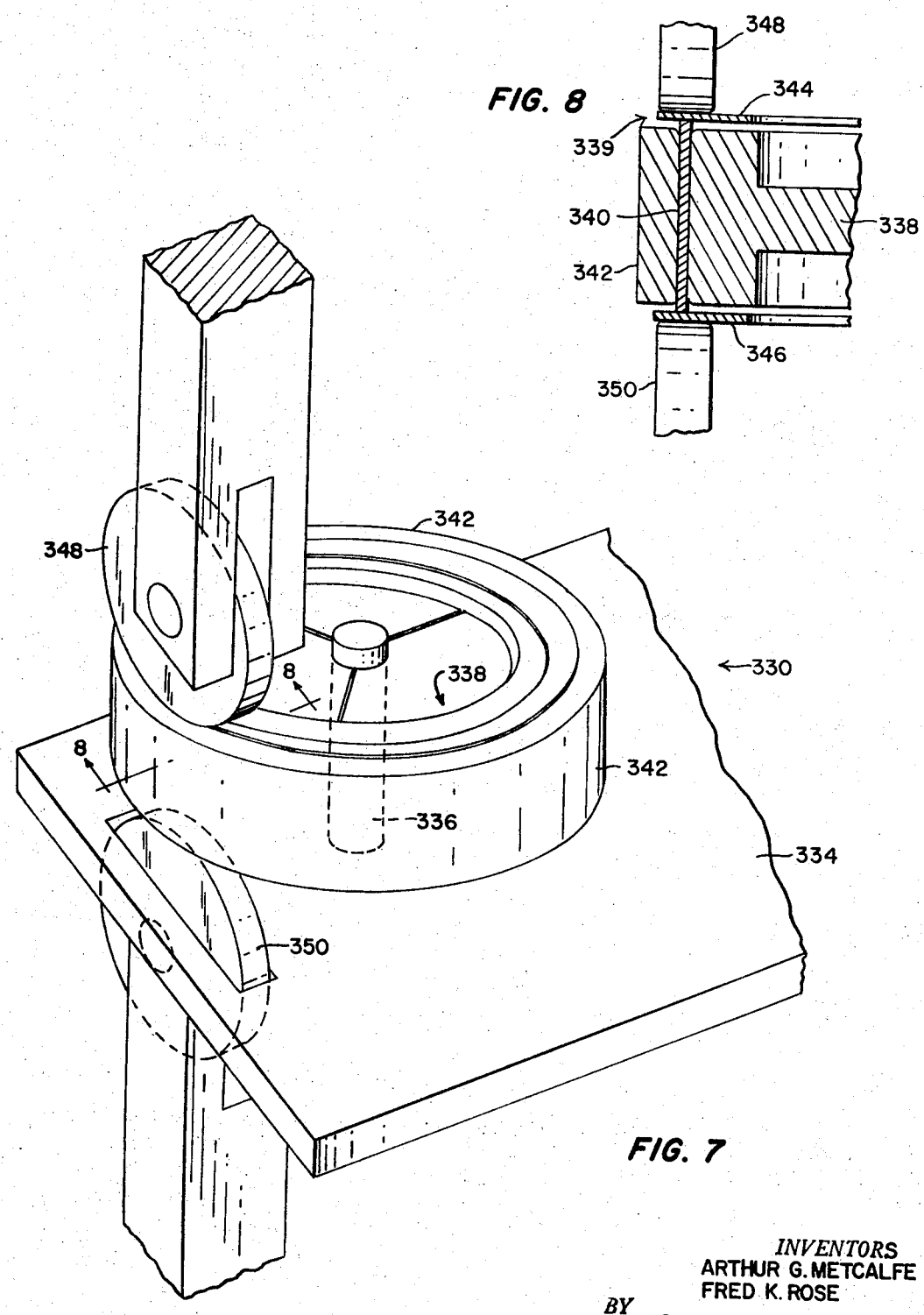

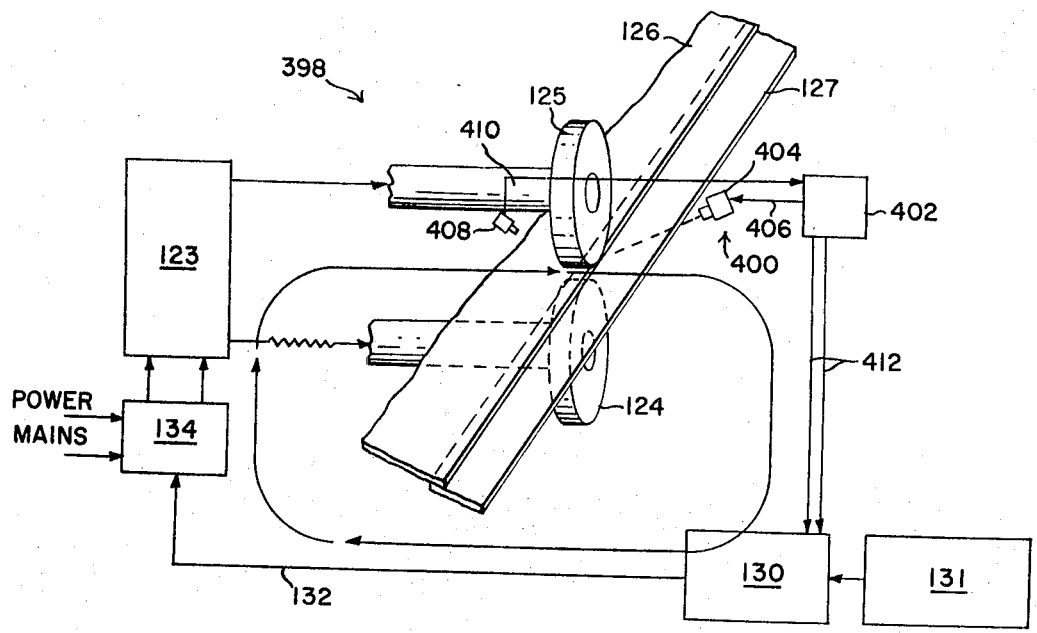
FIG. 15
PRIOR ART
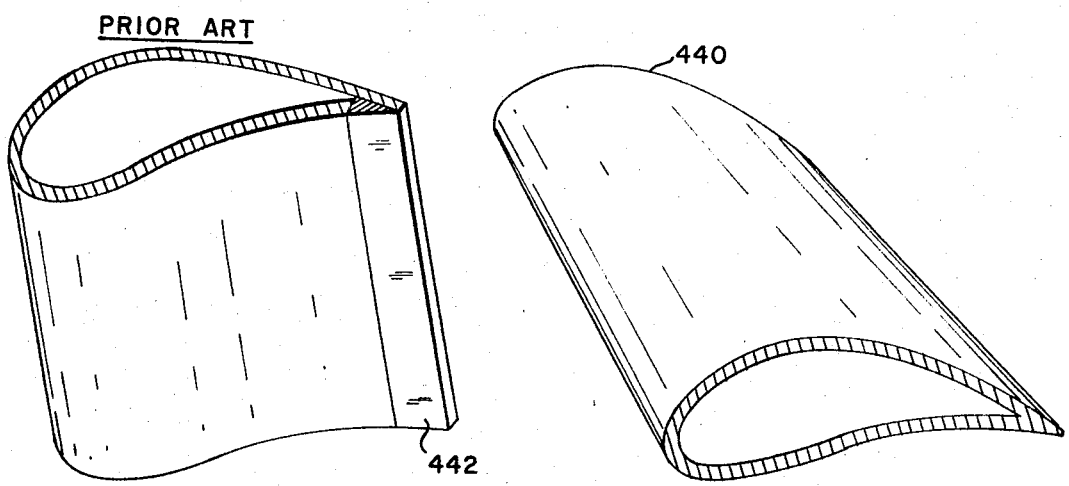
FIG. 33
FIG. 34
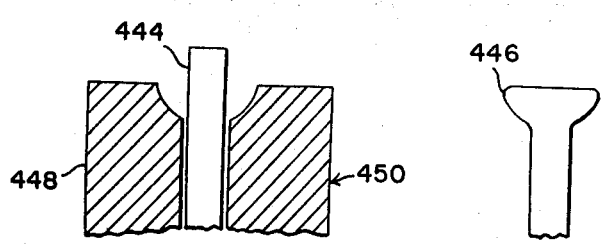
FIG. 39
FIG. 40
INVENTORS
ARTHUR G. METCALFE
FRED K. ROSE
BY
*Strauch, Nolan, Neale,*
*Nies & Kurz*
ATTORNEYS

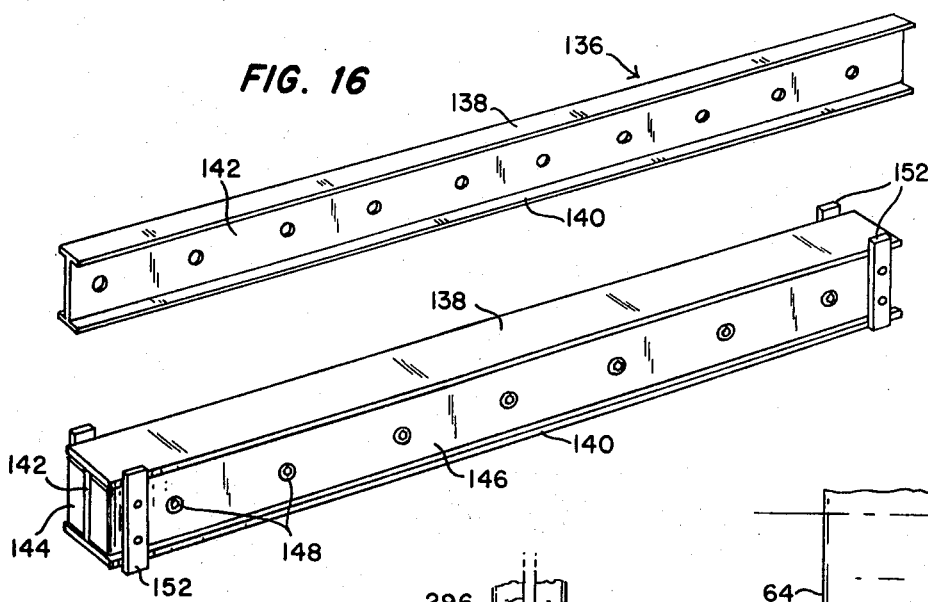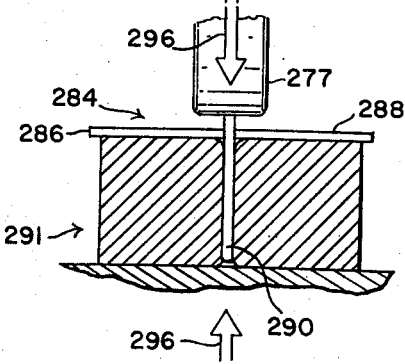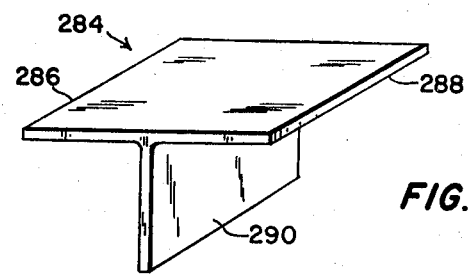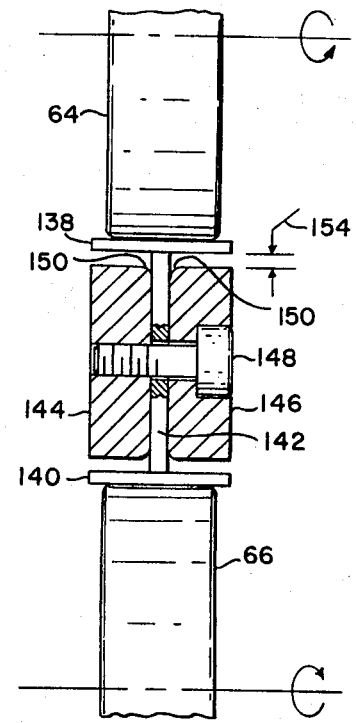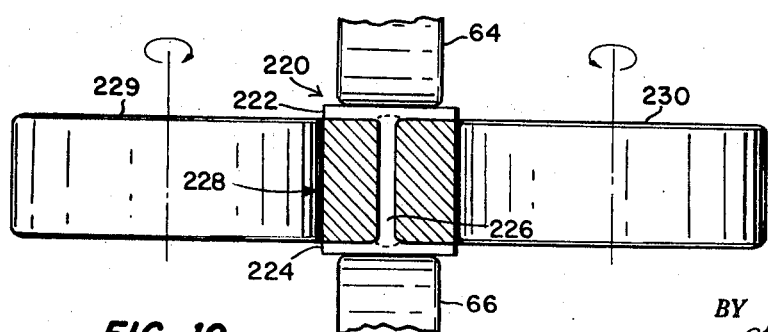

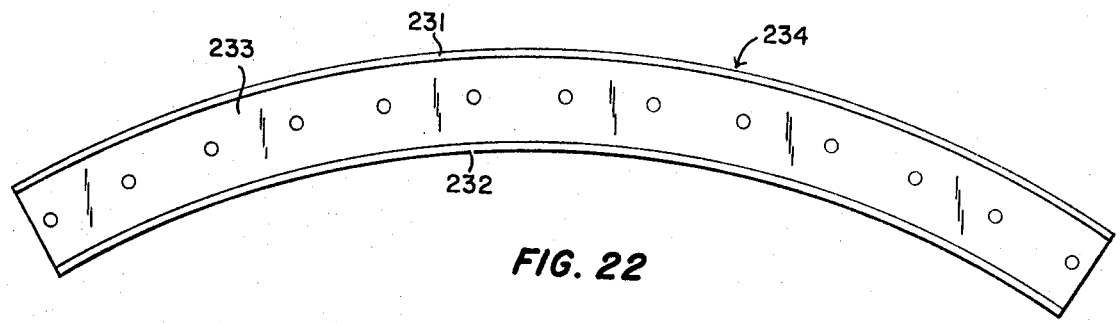
FIG. 22
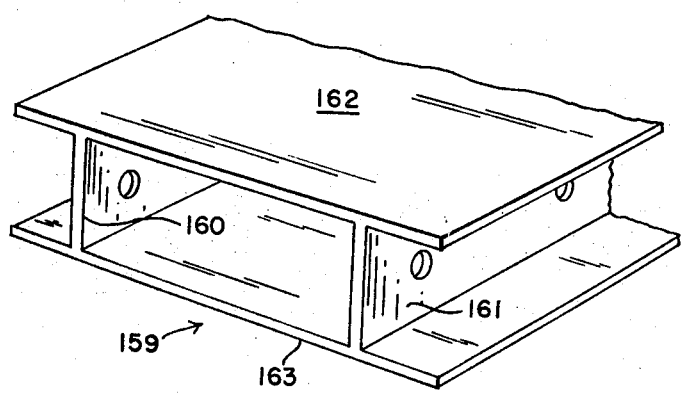
FIG. 23
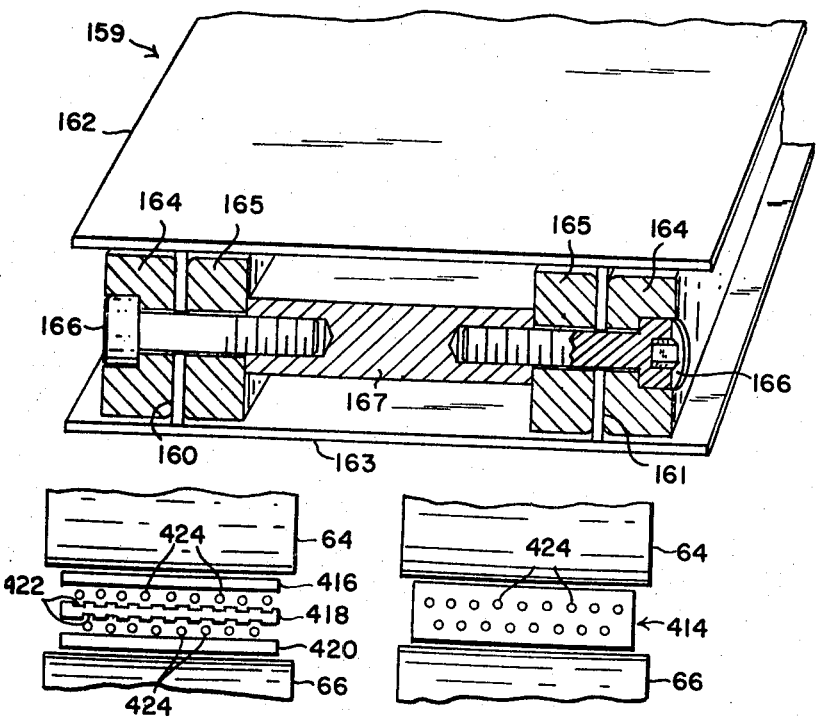
FIG. 24
FIG. 28
FIG. 29

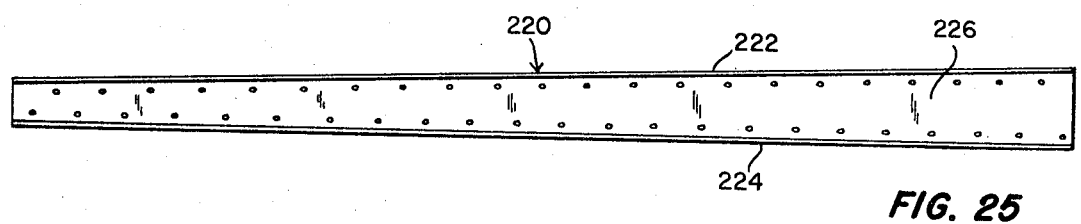
FIG. 25
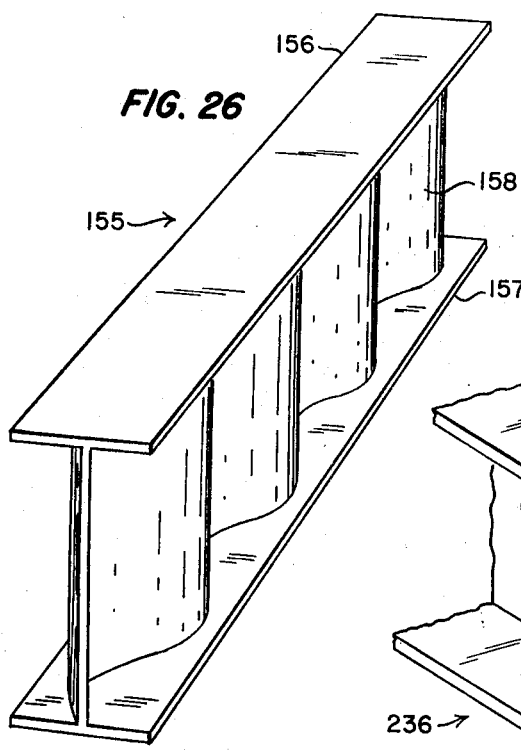
FIG. 26
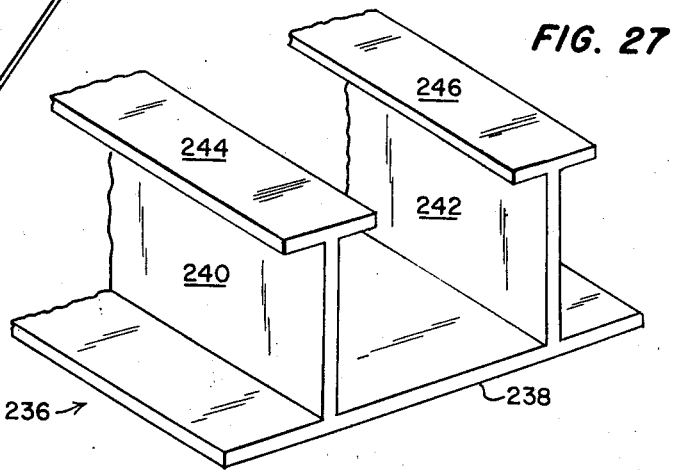
FIG. 27
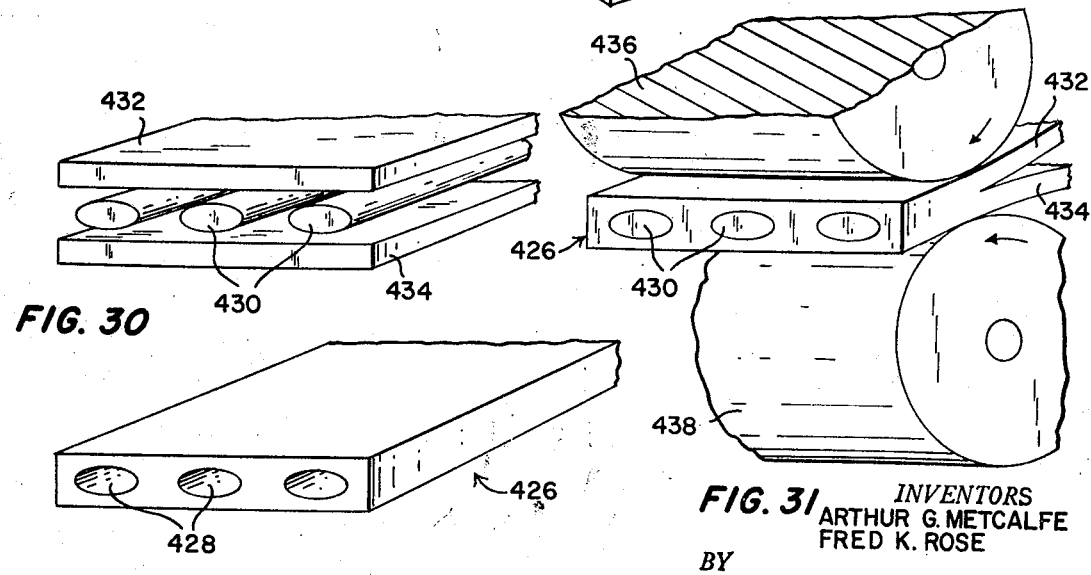
FIG. 30
FIG. 31
FIG. 32
INVENTORS
ARTHUR G. METCALFE
FRED K. ROSE
BY Strauch, Nolan, Neale, Nies & Kurz
ATTORNEYS

PRIOR ART

METALLURGICAL BONDING AND FORMING PROCESSES AND APPARATUS

This invention relates in one aspect to methods of and apparatus for forming continuous bonds between metallic members and, more specifically, to methods of and apparatus for forming continuous bonds between metallic members by metallurgical bonding; i.e., by diffusion of atoms of the materials from which the members are formed across the faying surface or surfaces therebetween without melting the materials.

Methods of bonding metallic members can be divided into several different categories. One of these is fusion welding in which there is melting of the members being joined in the welding zone. Roll and spot resistance welders and induction welders are exemplary of those which are of the fusion type.

Fusion welding is unsatisfactory in many circumstances because the high temperatures involved cause distortion and/or degrade or destroy the strength, ductility, and other metallurgical properties of the metals from which the members being joined are fabricated, especially if the metal is in a heat treated condition. Also, precise control of conditions in the bonding area is difficult, at best, because of the large differences between bonding area temperatures and the surface temperatures of the parts being joined. Further, in the fusion welding of oxidation sensitive metals, a protective atmosphere must be employed.

Brazing and braze welding are broad terms describing another category of bonding processes which involve the melting of a filler material disposed between two components to join the components together. The filler has a melting point below that of the components being joined. Thus, distortion and degradation of metallurgical properties may be less serious than in the case of fusion welding. However, because of the dissimilar materials they contain brazed and braze welded joints are subject to galvanic corrosion, making these bonding techniques unsatisfactory in many circumstances.

Metallurgical or diffusion bonding is another broad category of bonding techniques which has on occasion been employed because of the disadvantages of fusion bonding and brazing. In metallurgical bonding pressure is applied to the members being joined at a temperature low enough to maintain the members in the solid state but high enough to permit diffusion of atoms of the materials from which the members are fabricated across the faying surface or interface therebetween. Versions of metallurgical bonding heretofore employed include pressure bonding, gas pressure bonding, and roll or deformation bonding.

In pressure bonding the members to be joined may be assembled in a thin-walled retort to provide a protective atmosphere. The retort is then heated through the walls and pressure applied by means of a hot platen press. The pressure is maintained by the fixed or movable platen press until the bond is formed.

Gas pressure bonding is carried out in an autoclave and differs from pressure bonding in that the bonding pressure is provided by high pressure gas and the heat by a furnace contained within the autoclave. Typical pressures are 4,000 to 10.000 p.s.i. and the time required to produce a bond is typically an hour or more.

Problems encountered in both pressure and gas pressure bonding include contamination of surfaces during the heat-up cycle and gas entrapment between surfaces or the use of expensive vacuum bags to avoid gas entrapment. And, even then, the contamination problem is not always satisfactorily solved because of the gaseous contaminants liberated in the long heating cycles required by these techniques. Also, major surface depressions are not subject to pressure and will lead to bond line voids in the final product. Further, these processes have a limited scale-up potential because the machines increase rapidly in cost with size. In addition bonding simultaneously over the entire contact area or faying surface between parts becomes increasingly difficult as the size increases, and hollow parts cannot be made unless the cavities are filled with nonreusable inserts which must subsequently be removed. Also, very long bonding times are involved, which is undesirable for obvious reasons.

Deformation or roll bonding differs from the diffusion bonding techniques just described primarily in that a measurable reduction in the thickness of the parts being joined occurs; i.e., in that there is gross deformation of the parts. In roll bonding, the parts are stacked together with removable inserts and sealed in a close-fitting box of a suitable material such as mild steel. The box is heated in a furnace and passed through a hot rolling mill to bond the parts together. The box is reduced in thickness by 40 to 60 percent in the formation of bonds between the parts.

Gas entrapment is minimized in this process because the deformation is progressive. Also, surface irregularities are not critical as in pressure bonding, and long parts can be made. However, contamination and loss of surface activity occurs because the parts must be preheated with a long furnace soaking prior to rolling. In addition, nonreusable inserts are required to make hollow parts; and the parts must have uniform sections throughout their length. Because of these disadvantages the only major application of roll bonding of active metals such as titanium has been in the fabrication of corrugated and ribbed sandwich structures.

In view of the pronounced disadvantages of heretofore available bonding techniques other manufacturing processes have been used to produce members from supper alloys and active metals such as titanium despite the drawbacks of such methods discussed hereinafter. Foremost among these are probably extrusion and machining, which may be preceded by an operation such as forging.

Both extrusion and machining are limited in the types of shapes which can be produced. Machining is also many times almost prohibitively expensive since up to 90 percent of the metal initially present may have to be removed from the workpiece to produce the final structure. Extrusion also has additional drawbacks. For example, many metals cannot be successfully extruded. Nor can thin sections be produced by extrusion.

We have now discovered a novel technique for producing metallic and composite structures which does not have the disadvantages of heretofore available fabrication processes. More particularly, we have discovered novel improved methods and equipment by which metallic parts can be metallurgically bonded in only a few seconds and in air or with simple protection from the atmosphere. In comparison to heretofore available bonding techniques our invention not only provides an increased capability for joining diverse parts and material of varying section, but significantly reduces process times and may eliminate the need for a vacuum or inert gas environment. Moreover, our invention limits heating of the parts to the bonding area, minimizing or eliminating metallurgical damage. It also permits precise control of pressure and temperature, which provides improved, reproducible results.

In metallurgical bonding in accord with the present invention, by which the foregoing and other important advantages are obtained, localized pressure is exerted on the parts to be joined by a rotatable electrode of heat resistant conductive material which is biased against the members by a fluid-activated motor. The parts being joined are moved relative to the electrode, and programmed electrical current is passed through the electrode so that a continuous bond is formed between the parts by localized pressure and heat in the bonding area; i.e., the areas of the parts contiguous to the line of contact between the electrode and the member against which it is biased. The temperature and pressure are maintained sufficiently low that no melting occurs, but high enough for the parts to become sufficiently plastic to eliminate porosity and shear surface contaminants in the bonding area. In this conjunction, local plastic flow begins at a few asperities and gradually spreads as the pressure on that parts is increased until full contact of the parts is made.

The surfaces to be joined only pass current after coming into contact under the pressure applied through the wheels so that heating occurs only as the oxide film is sheared and metal-to-metal contact made. As the flow of current increases, the temperature in the bonding area becomes higher, plastic flow of the metal occurs, and full contact across the joint is achieved.

Although the high pressures used (typically in the range of 500 to 10,000 p.s.i.) exceed the flow stress of the metal in the bond area, the rigid heat resistant electrode permits this pressure to be applied locally. Accordingly, gross deformation of the parts is avoided, which is an advantage not possessed by previously employed metallurgical bonding techniques such as roll bonding.

Since the line or areas at which the metals come into contact with each other may be brought to a temperature at which metallurgical bonding occurs in a time not exceeding a few seconds in the practice of our invention, the bulk of the metal in the parts being joined remains in a relatively cold state. Consequently, the parts being joined are not highly heated, although the metal contiguous to the line of contact attains the necessary degree of plasticity. Accordingly, parts can be joined with only minimal, if any, degradation of their metallurgical properties.

For example, because there is only localized heating and that for only a few seconds at most, titanium alloys such as Ti-6A1-6V-2Sn in the solution treated and aged condition can be joined without detrimental changes in properties. In contrast, in other metallurgical bonding techniques, the result is materials with mill-annealed properties regardless of whether or not the parts are heat treated prior to the bonding process because of the long times at high temperature.

Furthermore, the localized deformation of the parts along the bond line prior to heating in our process brings the parts together and excludes contaminating gases from the bonding area before heating occurs. It has been found that titanium and other reactive metals and alloys can as a consequence by joined in air without the heretofore necessary protective atmosphere or vacuum. Furthermore, this eliminates the metallurgical degradation which entrapped gases cause, producing joints of higher quality than the previously discussed metallurgical bonding processes, which do not provide for the exclusion of entrapped gases.

We have also discovered that the current passing through the wheels and parts heats the wheels and parts concurrently so that the parts being joined approach an isothermal condition. That is, the surface temperatures of the parts do not vary greatly from the temperature along the bond line, and temperatures do not vary appreciably over the span of the rotatable electrode. As a result, bonds may be formed much more rapidly in accord with the present invention (in one to a few seconds) than by the heretofore employed metallurgical bonding techniques in which process cycle times are measured in terms of hours, not seconds.

Also, because of the isothermal heat distribution, sound, uniform bonds may be produced over the entire faying surface between the parts being joined. This is a decided improvement over metallurgical bonding processes of the cold electrode, spot, and wheel type in which, as in resistance welding, a recrystallized nugget is obtained in the joint area.

It is preferred in our invention that the bonding temperature be maintained at a selected programmed level by regulating the current through the parts being joined. This is done by generating a feedback signal indicative of the bonding conditions and utilizing this signal to make any corrections required to maintain the bonding temperature at the desired level.

This unique type of control is not available in any other method of metallurgical bonding and is of considerable importance. This is because it permits definite measurements to be made of the conditions at the bond line at the time of joining and precise regulation of these conditions. Accordingly, quality control can be incorporated into the process and consistent, reliable parts may be made continuously.

Another advantage of our process is that a joint is established by the time the parts pass beyond the nip of the rotatable electrode so that the electrical contact resistance across the joint interface and therefore through the parts is reduced to a very low level. This low resistance path causes the current to move from a path normal to the wheels to one behind the wheels, thereby prolonging the heating and giving further improvement in the bond joint. This effect, which we call "thermal lag," appears to contribute to the high bond quality obtained by the present process, although we do not believe that the operability of our bonding technique is dependent on the existence of this effect.

Another advantage of our invention is that hollow sections can be made without supports or inserts in the cavities. This is accomplished by restricting the electrode applied force to the areas required to be bonded. This is a particularly important advantage since, in other metallurgical bonding methods, it is necessary to fill cavities with a removable filler material or inserts, which in most cases must be acid etched to remove, a procedure which requires long periods of time and is therefore expensive. Long etch periods are also known to deteriorate some metals and alloys.

Yet another advantage of our process is that the length of the parts is not limited as it is in the pressure bonding, for example. Also, it can be used to make variable cross section parts that cannot be made by roll bonding.

A further advantage of our process is that surface preparation is not critical as long as the parts being joined are clean. This is important since it significantly reduces the costs of preparing the parts for bonding.

Still another advantage of our invention is that metals and their alloys can be bonded without damage at higher temperatures than by other processes. For example, titanium may be joined at temperatures up to 400° F. above the beta transus without degrading joint properties which is surprising since it has heretofore been thought that the titanium must be joined at temperatures below the beta transus to prevent unacceptable degradation of mechanical properties in the joint area. This attribute of the present invention is important since solution or spheroidization of surface oxides occurs more rapidly as the temperature is raised with a corresponding reduction in the time required to produce a sound joint.

Yet another advantage of our invention, attributable to the novel method of controlling the bonding temperature discussed above, is that consistent, reliable, reproducible joints can be obtained. This is of obvious importance.

Another advantage of the present invention is that dissimilar materials may be readily formed and joined to produce usable composites without damage to the materials being joined. An example of this is the production of boron filament reinforced tape in which a series of adjacent filaments are sandwiched between sheets of titanium in a manner such that the titanium completely surrounds the filaments.

A further important facet of our process is its capability for simultaneously joining multiple layers of material. Because joint strength approximates parent material strength, a part made in this manner has strength similar to that of solid material. With our process it is, therefore, possible to make a part with an interior core area of a different alloy than the surface skin or layer. Advantage can thereby be taken of the various properties of different alloys in a single part to produce a superior structure.

Another advantage of the present invention is that parts can be shaped or simultaneously shaped and joined since plastic flow of the metal is effected. For example, end caps can be joined to a web to form an I-beam and fillets simultaneously formed between the web and end caps by confining the parts between tooling of appropriate configuration as they are joined. Or, as a further example, the edge of a member can be upset to form a cap.

A further and most important attribute of our novel metallurgical binding technique is the extreme versatility it has. It can be employed to bond a great variety of metals including many which cannot be satisfactorily joined by other techniques and to bond metals to nonmetals or to metals of different compositions. In addition multiple bonds can be simultaneously formed if desired by employing multiple electrodes. Further, the present invention can be utilized to produce a wide variety of straight and curved shapes of both uniform and nonuniform cross section which cannot be formed by other bonding techniques because of the materials and/or configuration involved or even by other manufacturing techniques.

For example, some structural shapes of materials which cannot be satisfactorily joined by bonding are currently produced by extrusion as indicated above. This technique is of course limited to shapes having uniform cross sections. No such limitation exists as far as the present invention is concerned, and it may be readily utilized to produce structures such as tapered and/or curved beams, nonuniformly sectioned airfoils, panels in which the ribs are of different heights, etc. Furthermore, structures with very thin sections can be produced by the present invention whereas they cannot be by extrusion.

In other cases the present invention is capable of producing structures at a lower cost than they can be by processes such as machining since there is no removal of excess materials involved. It is also capable of producing wider bonds than many other heretofore known bonding techniques and is also capable of higher bonding speeds.

Furthermore, repairs to bonds in structures fabricated in accord with the present invention can be made and parts can be added and changed without putting the entire structure through a second bonding cycle. This provides a decided advantage over heretofore available metallurgical binding techniques from an economic point of view.

In addition, in the novel techniques described herein, the tooling employed to maintain the parts being joined in the proper relationship is heated to only relatively low temperatures. Accordingly, the tooling may be made from inexpensive materials such as mild steel and even then it will have a long service life.

Also, the novel bonding technique disclosed herein permits many design alterations to be made in the structures fabricated without changes in the tooling employed. This is also advantageous from the economic point of view.

From the foregoing it will be apparent that one primary and important object of the invention is the provision of novel, improved techniques and apparatus for producing a continuous bond between parts of metallic materials.

Other related and important objects of this invention reside in the provision of novel, improved metallurgical bonding techniques:
1. capable of producing bonds in times much shorter than those required in other techniques of making continuous metallurgical bonds.
2. by which bonds can be produced in air and which accordingly do not require vacuum or protective gas environments.
3. which are exceedingly versatile in that they can be used to join parts having a wide variety of configurations and compositions and to produce composite structures.
4. capable of shaping and thereby imparting specified external configurations to parts and of shaping parts at the same time that a bond between them is formed.
5. in which bonding temperatures and pressures can be precisely regulated so that uniform, reproducible joints can be obtained.
6. capable of minimizing metallurgical damage to the parts being joined even when they are composed of metals in a heat treated condition.
7. in which there is minimal deformation of the parts being joined.
8. capable of producing hollow structures without the use of inserts.
9. which require a minimum of surface preparation.
10. in which there is not the limitation on the length of the parts being joined appurtenant to heretofore employed metallurgical bonding techniques.
11. capable of producing structures which cannot be satisfactorily made by other manufacturing processes such as machining, extrusion, welding, brazing, etc., or which can be produced by such processes only with difficulty and/or considerably greater expense.
12. capable of producing structures which require little if any finishing to meet specified dimensional tolerances.

Another important object of the present invention is the provision of novel, improved apparatus for joining parts by bonding techniques having the advantages described above and various combinations of these advantages.

Additional important but more specific objects of the invention reside in the provision of novel, improved metallurgical binding apparatus:
1. which employs rotatable biased electrodes of heat resistant conductive material for exerting pressure on the parts being joined and for connecting the parts across an electrical power source in order to heat the parts.
2. which, in conjunction with the preceding object, have a plurality of rotatable electrodes so that multiple bonds may be simultaneously produced to join components along multiple bond lines or to simultaneously join a plurality of components.
3. which includes control components for so regulating the flow of current through the parts being joined as to maintain temperature conditions along the bond line substantially uniform.
4. which includes multiple electrodes rotatable at different speeds so that different parts can be simultaneously joined to surfaces of a further component which have a different contour or length.
5. which includes an arrangement for holding the members being joined in abutting relationship while they are moved relative to the rotatable electrodes to form the bond therebetween.

Other important objects, additional novel features, and further advantages of the present invention will become apparent from the appended claims and as the ensuing detailed description and discussion proceeds in conjunction with the accompanying drawing, in which:

FIG. 7 is a pictorial view of a fifth form of metallurgical bonding apparatus contemplated by the present invention;

FIG. 8 is a section through the apparatus of FIG. 7 and a curved I-beam of the type which the apparatus of FIG. 7 is intended to produce, taken substantially along the line 8—8 of FIG. 7;

FIG. 15 is a schematic illustration of a seventh form of control system;

FIG. 16 is a pictorial view of an I-beam fabricated by joining together components in accord with the principles of the present invention;

FIG. 17 is a pictorial view of the I-beam of FIG. 16 and the tooling which is employed to hold the components of the beam in the proper relationship while they are joined;

FIG. 18 is a section through the I-beam and tooling and the rotatable pressure applying and current conducting electrodes by which the components of the I-beam are joined into an integral structure;

FIG. 19 depicts an alternate mechanism for holding the components of an I-beam in the proper relationship while they are joined;

FIG. 20 shows, in section, an alternate arrangement for producing a T-joint in an I-beam or other member;

FIG. 21 is a pictorial view of a T-joint fabricated by the arrangement shown in FIG. 20;

FIG. 22 is a top view of a curved I-beam fabricated in accord with the present invention;

FIG. 23 is a pictorial view of a hollow box beam fabricated in accord with the principles of the present invention;

FIG. 24 is a pictorial view, partly in section, depicting the tooling employed to hold the components of the box beam illustrated in FIG. 23 in the proper relationship while they are joined;

FIG. 25 is a side view of a tapered I-beam fabricated in accord with the principles of the present invention;

FIG. 26 is a pictorial view of an I-beam with a sine wave web fabricated in accord with the principles of the present invention;

FIG. 27 is a pictorial view of a tapered web reinforced panel fabricated in accord with the principles of the present invention;

FIG. 28 is a generally diagrammatic view of the components of a filament reinforced type member which may be fabricated by the bonding technique of the present invention;

FIG. 29 is a view similar to FIG. 28 showing the member after its components have been joined into a unitary structure;

FIG. 30 is a pictorial illustration of two parts intended to be joined into a unitary structure in accord with the present invention, the parts being separated by passage defining inserts which may be later removed to form passages in the unitary structure;

FIG. 31 is a pictorial illustration of the manner in which the components of the unitary structure are joined;

FIG. 32 is a pictorial view of the final unitary structure with the inserts removed;

FIG. 33 is a pictorial view of an airfoil structure fabricated in accord with presently employed techniques;

FIG. 34 is a pictorial view of a similar structure fabricated in accord with the principles of the present invention;

Figure 38:
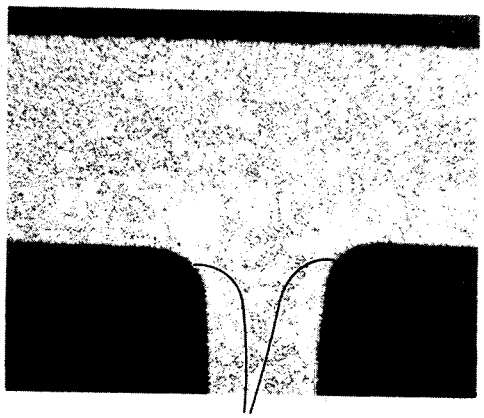

FIG. 38 is a photomicrograph of a section through an I-beam formed from components joined in accord with the principles of the present invention, FIG. 39 is a section through a metallic member which is to be formed to a specified external configuration in accord with the principles of the present invention and the associated tooling provided to confine the metal as the member is formed; and FIG. 40 is an end view of the member after forming.

Figure 1:
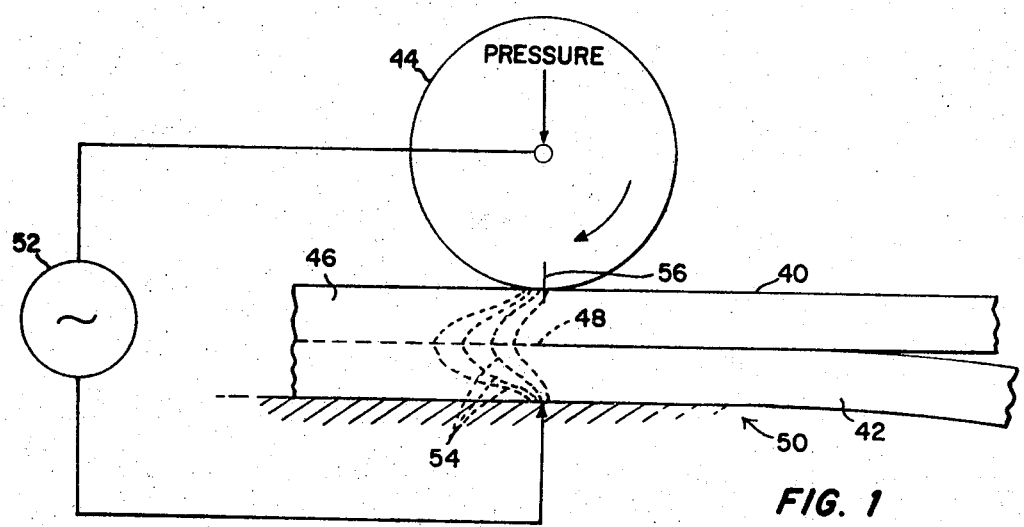
FIG. 1 is a diagrammatic illustration of components being joined by the novel metallurgical bonding process described herein.

Referring now to FIG. 1 of the drawing, the novel metallurgical bonding process disclosed herein and described briefly above involves the application of localized heat and pressure to the parts to be joined (40 and 42 in FIG. 1) by a rotatable electrode 44 fabricated of a heat resistance conductive material to join them into a unitary structure 46 by forming a continuous bond 48 between the parts as they move relative to the electrode. The pressure is exerted on the parts in a direction normal to the interface or faying surface therebetween by biasing the rotatable electrode against the assemblage 50 of parts being joined with a force of predetermined magnitude. This arrangement localizes the pressure to an area generally commensurate in width with the electrode and extending longitudinally in the direction of movement for a short distance from the line of contact between the rotatable electrode and the member against which it is biased; i.e., from the nip of the electrode. This incremental application of bonding pressure is an important attribute of the invention since the pressure can be applied more uniformly than in heretofore available metallurgical bonding processes such as pressure and gas pressure bonding.

The heat is generated by connecting one side of an electrical power source 52 to the rotatable conductive electrode 44 and the other side of the power source to the assemblage of members 50 on the opposite side thereof from the electrode so that the current flows from the electrode through the parts across the faying surface therebetween, which is coincident with bond line 48. By utilization of the technique just described high temperatures are confined to a localized area generally equal in width to the electrode and extending generally from the line of contact between the electrode and the member against which it is biased in the direction of movement of the parts being joined.

Figure 2:
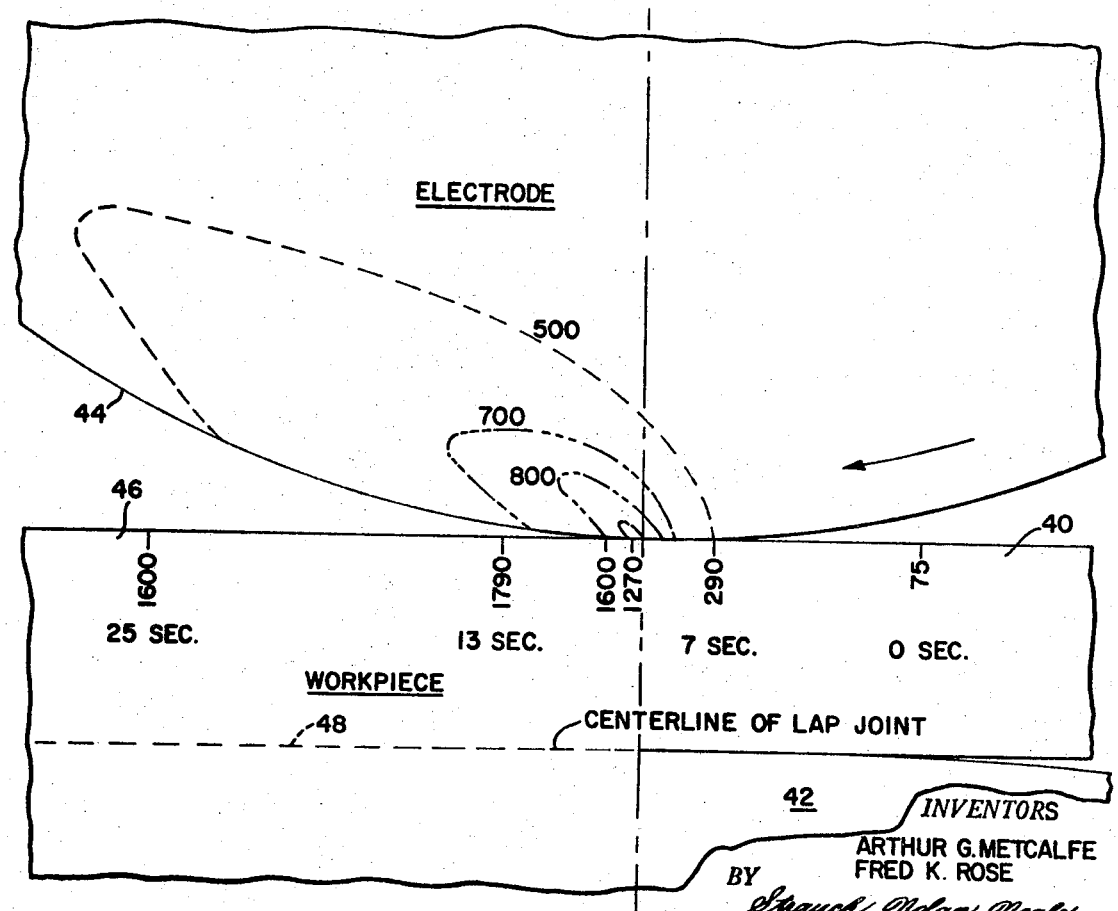
FIG. 2 is a representation of the temperature distribution in the parts being joined and in a rotatable, pressure exerting electrode biased against one of them in accord with the principles of the present invention.

As shown by the isotherms 54 in FIG. 1 and the temperature distribution along the exposed surface of part 40 in FIG. 2, the area of the unitary structure 46 spanned by electrode 44 remains at a relatively high temperature for a considerable distance (and therefore period of time) after the bonded portion 46 moves beyond electrode 44. This "thermal lag" occurs because there is beyond the line of contact 56 between electrode 44 and part 40 a continuous bond between parts 40 and 42 and therefore a path of relatively low resistance through the bonded portion 46 of the structure. The current therefore flows to a large extent across completely bonded portions of the parts rather than directly thereacross since the direct path crosses the faying surface at a point where bonding between the parts is not completed. As discussed above, this thermal lag is believed to contribute to high bond quality.

Referring still to FIGS. 1 and 2, parts 40 and 42 are not heated to more than an insignificant extent before they are brought into contact by the pressure of electrode 44 because there is no path for the current across the parts until the members are brought into firm contact and only a poor path for a period thereafter so that there is very little current flow across the members until they reach the vicinity of contact line 56. This is of considerable importance as it minimizes the formation of surface oxides and provides for the exclusion of gaseous contaminants before significant heat is generated in the bonding area. As a result, the bonding cycle can be carried out in air even though the parts are fabricated of titanium or other reactive metals. This provides a considerable economic advantage over previously employed diffusion bonding processes in which the parts being joined must be disposed in an evacuated or inert gas filled environment if they are made of reactive metals. And even this precaution sometimes produces only minimally satisfactory results.

The pressures and temperatures employed in the present invention will vary depending upon the composition of the parts being joined, their thickness, the bonding speed and similar considerations. It is essential, however, that they be maintained low enough to keep the parts in the solid state throughout the cycle (i.e., to prevent melting in the bonding area). On the other hand they must be kept high enough to bring the surfaces being joined into complete contact and allow a diffusion of atoms across the faying surface to form the bond. This in turn requires that the pressure be sufficiently high to cause localized deformation of the parts along the surfaces at which they are to be joined by causing plastic flow in order to shear oxides from these bonding surfaces. Also, the temperature to which the parts are heated in the bonding area must be high enough to permit the required diffusion of atoms across the faying surface to be completed in not more than a few seconds.

In any event, it is preferred that the bond line temperature be kept uniform, but slightly above the surface temperatures of the parts being joined. This is important in that it allows the process to be controlled to limit overall deformation to less than 1 percent.

With respect to the magnitudes of these parameters contemplated by the present invention, parts of titanium alloys such as Ti-6A1-4V represent one class of materials which can be joined to particular advantage by the novel technique described herein. For such material, typical bonding pressures are in the range of 500 to 10,000 p.s.i. (for a typical 8 inch diameter rotatable electrode, these pressures can be realized by using electrode-exerted forces of 100 to 2,000 pounds per inch of wheel width) and peak temperatures are maintained in the range of 1950°–2300° F. by employing currents in the 2,000 to 20,000 ampere range.

In a typical manufacturing operation involving parts fabricated from alloys of the type in question, bonding speeds of 5 to 10 inches per minute can be readily attained. This represents a considerable advantage over the heretofore employed metallurgical bonding techniques in which the cycle time required to produce a bond is typically an hour or more.

In conjunction with the foregoing it was pointed out above that the capability of the present invention for joining titanium and its alloys at temperatures even as high as 2,300° F. without degradation of the material in the joint area is completely unique. Titanium alloys processed at temperatures above the beta transus by heretofore known techniques show a sharp decrease in ductility, and processing at high temperatures has accordingly heretofore been avoided. Surprisingly, it has been found that temperatures above the beta transus for only a few seconds as in the present invention do not produce a significant decrease in ductility. This is important first because the ability to use higher temperatures results in decreased process time because of the more rapid solution or spheriodization of the surface oxides on the surfaces of the parts being joined. Also, advantage can be taken of the desirable attributes of beta treatment including increased notch strength, improved resistance to stress corrosion cracking, and increased fracture toughness.

As mentioned above, a further advantage of our process is that surface preparation is not critical so long as the parts are clean. For example, it has been found that edges of parts cut by a sharp shear can be joined as well and as easily as machined surfaces, and cleaning by etching or abrasive cleaning has been found to be acceptable for titanium and its alloys.

In some cases a surface coating or activator improves bonding although this is not essential to the process. The activator makes contamination from the atmosphere less damaging and increases diffusion rates. The activator is chosen to be as compatible as possible with properties desired in the base metal such as unimpaired oxidation resistance and strength. As an example, a flash of nickel having a thickness of 0.0001 inch or less improves reliability of joints in nickel-base alloys. Nickel is also satisfactory with stainless steel. Silver is useful with beryllium. Coating materials useful with other base metals will be readily apparent to those skilled in the relevant arts.

One of the most important attributes of our novel bonding technique as just described is the dramatic increase in the uniformity of the structure of the metal in the joint area in comparison to that resulting from conventional bonding techniques. This is important because of the increased strength and improvement in other metallurgical properties associated with uniform structures.

Figure 36:
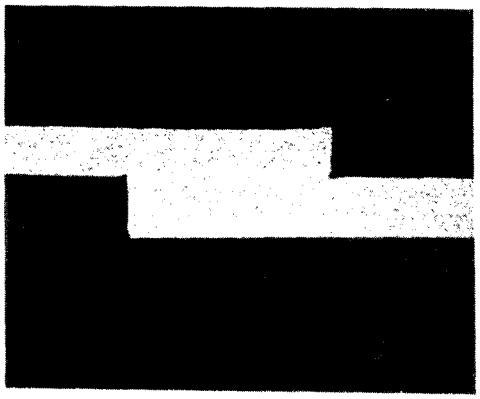
FIG. 36 is a photograph of a lap joint formed by the process of the present invention.
Figure 35:
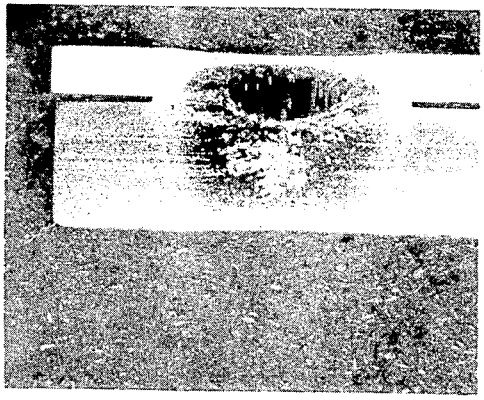
FIG. 35 is a photomicrograph of a lap joint formed by resistance welding.

The extent to which structural change in the joint area is minimized by bonding in accord with the present invention is readily apparent from comparing FIGS. 35 and 36, which are 7X photomicrographs of lap joints made between titanium alloy (Ti-6A1-4V) parts by resistance welding and the novel technique described herein, respectively. The structure in the joint produced in accord with the present invention is substantially uniform and identical to that elsewhere in the parts. In contrast the structure in the resistance welded joint is characterized by large grain size and lack of uniformity. Also, there is surface depression and incomplete or no bonding across much of the faying surface.

Figure 37:
FIG. 37 is a photomicrograph of a section through an I-beam formed of components jointed by burn-through welding.

The minimization in structural change in joint areas produced by our invention is also apparent from a comparison of FIGS. 37 and 38, which are 20X photomicrographs of T-joints fabricated by bonding together parts of Ti-6A1-4V alloy. Burn-through welding was used to make the joint shown in FIG. 37 while that of FIG. 38 was fabricated in accord with the principles of the present invention.

The structure in the joint shown in FIG. 38 is again essentially uniform and has properties similar to those of the parent materials. The joint shown in FIG. 37, like that produced by resistance welding and shown in FIG. 35, is characterized by grain growth and surface depression and is markedly inferior.

Figure 3:
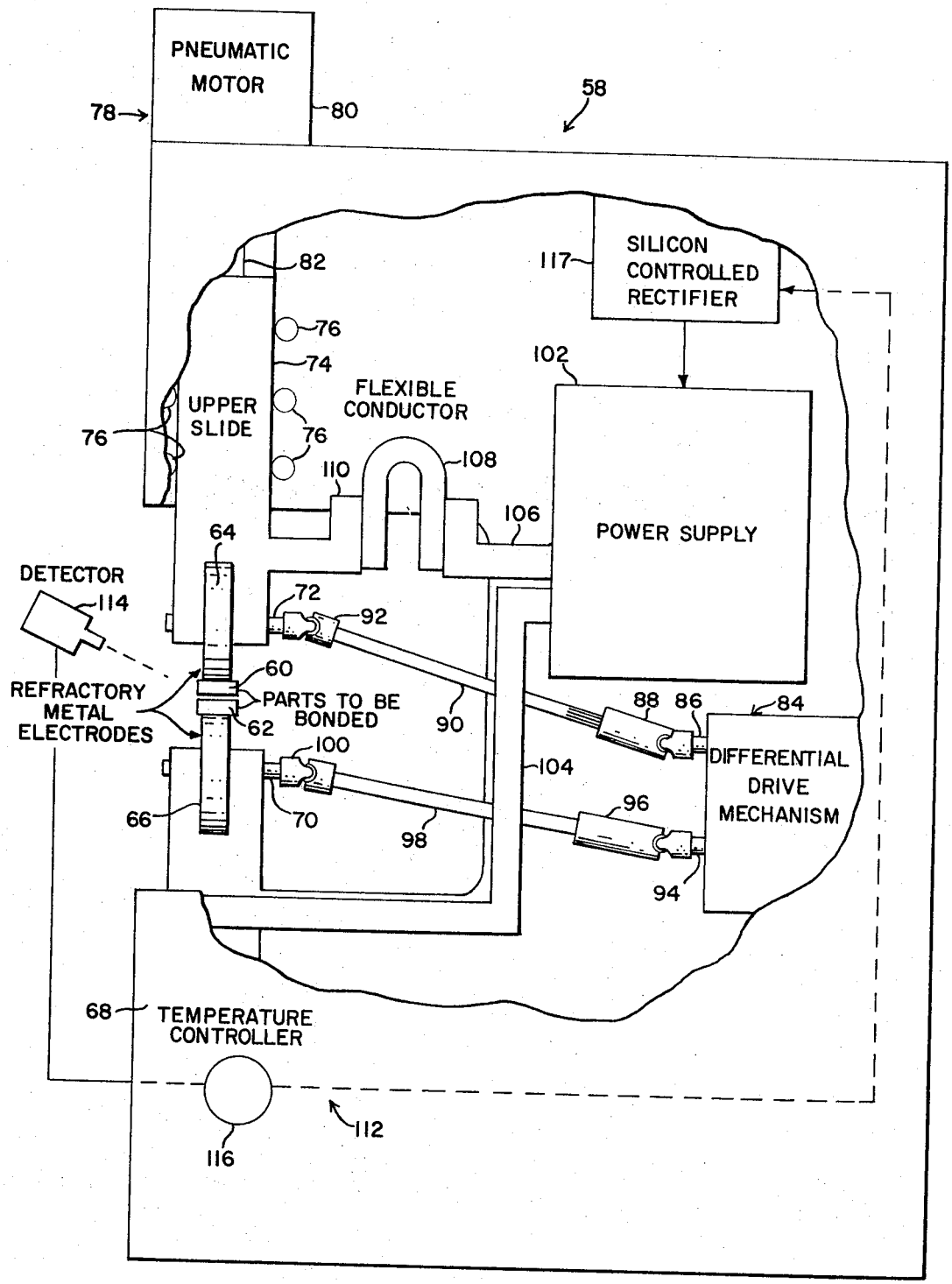
FIG. 3 is a generally diagrammatic side view of one form of metallurgical bonding apparatus constructed in accord with the principles of the present invention.

Referring again to the drawing, FIG. 3 depicts diagrammatically one form of metallurgical bonding apparatus 58 which may be employed to join parts in accord with the principles of the present invention. In apparatus 58 bonding is accomplished by effecting movement of the parts 60 and 62 to be joined between upper and lower rotatable electrodes 64 and 66, which are fabricated from a conductive, heat resistant, high strength metallic material.

Lower electrode 66 is rotatably supported from the frame 68 of machine 58 by a shaft 70 journaled in suitable bearings (not shown). The upper electrode 64 is rotatably supported by a similar shaft 72 from a slide 74. Slide 74 is mounted for vertical rectilinear movement toward and away from lower electrode 66 in guides 76.

In the processing cycle, a force of predetermined magnitude is exerted on the parts 60 and 62 being joined by biasing slide 74 and upper electrode 64 toward lower electrode 66. The bias is exerted by pneumatic motor 78 which includes a cylinder 80 fixed to the frame 68 of the apparatus and connecting rod 82 extending from the cylinder and fixed to the upper end of slide 74.

The relative movement of parts 60 and 62 referred to above is accomplished in apparatus 58 by a conventional differential drive 84 having one output shaft 86 connected to the shaft 72 supporting upper electrode 64 by universal joint 88, shaft 90, and universal joint 92. The second output shaft 94 from the drive mechanism 84 is connected to the shaft 70 supporting lower electrode 66.

The type of drive mechanism just described is particularly advantageous in the fabrication of structures such as the curve I-beam illustrated in FIG. 22 in which two caps or flanges are simultaneously attached to a web disposed therebetween. The differential-type drive mechanism permits the surface speeds of the two electrodes 64 and 66 to be matched to the surface speeds of the two flanges or end caps which of course move between the electrodes at different speeds so that the surface speeds of the electrodes and the members against which they are biased are equal. This feature can also be used to advantage in other applications where two parts are to be simultaneously joined to different length edges of a third component.

Notwithstanding the foregoing it will be apparent that a different drive arrangement can be employed if desired. For example, for applications where different speeds of the two electrodes are not required, a simpler form of gear, sprocket, or other type drive can be substituted for the depicted differential drive mechanism. Also, instead of rotating electrodes 64 and 66 to move parts 60 and 62 therebetween, the electrodes may be mounted for free rotation and relative movement effected by pushing or pulling the components therebetween.

As discussed above, in metallurgical bonding according to the present invention, heat is applied to the components being joined as well as pressure. In bonding apparatus 58 this is accomplished by connecting one side of the output from a conventional AC or DC power supply 102 through conductor 104 to lower electrode 66 and the other side of the power supply through rigid conductor 106, flexible conductor 108, and rigid conductor 110 to upper electrode 64.

In conjunction with the foregoing, it is important in making bonds in accord with the present invention that generally isothermal conditions be maintained in the parts being joined in the bonding area although it is preferred that these parts be at a slightly higher temperature at the bond line than at their external surfaces. To meet this criteria it is necessary that the electrodes be fabricated from a material which has an electrical resistance similar to that of the structure being fabricated so that the structure and the rotatable electrodes will be heated to generally the same extent. Also, while the exact requirements for the composition of the electrodes have not been identified, the material should have high strength and rigidity at high temperatures, good resistance to oxidation (particularly for apparatus intended to operate without benefit of a protective environment), and ready availability at reasonable cost. Also, the material should not be one which will stick to the parts being joined or the bonded structure. Molybdenum and its alloys such as TZM meet these requirements.[1] ([1]bonding temperatures as high as 2500° F. have been used without damage to TZM molybdenum alloy electrodes.) Other materials can, however, be employed. Among these are tungsten and its alloys such as W-Re, tantalum and its alloys such as 90Ta-10W and T222, and in some cases steel. If steel is used, it is preferably provided with a chromium or similar plating to prevent the electrode from sticking to the parts being joined.

The dimensions of the rotatable electrodes 64 and 66 will of course depend upon the configuration of the structure being fabricated. The diameter of the electrodes will, however, typically be in the range of 6 to 10 inches although electrodes having a smaller diameter are required to follow irregular contours such as those occuring at a joggle in the cap of an I-beam, for example. Apart from criteria of the type just mentioned, electrodes of larger diameter will generally be employed since they have a larger arc of contact and make it possible to use higher bonding speeds.

Typically, the electrodes will be from one half to 1 inch wide. Widths of this range have been found suitable for the manufacture of T-joints and for typical lap joints, which have a faying surface ranging up to one half inch wide. The range of electrode width just specified is, however, certainly not critical. For example, electrodes in the form of rolls rather than wheels may be used where circumstances warrant such as in the manufacture of hollow sections.

The final and one of the more important components of the welding apparatus 58 illustrated in FIG. 3 is a control system identified generally by reference character 112. The primary function of the control system is to so regulate the current flowing through the parts being joined and the unitary structure into which they are formed as to maintain the bonding temperature substantially constant or to vary it in a predetermined pattern. As shown in FIG. 3, this system typically includes a detector or sensor 114 for detecting conditions at the bond line and feeding back a signal to a temperature or process controller 116 for comparison with a set point reading to determine deviations from desired value. The latter translates any deviations from the predetermined conditions into a corrective signal, which is fed to a power controller 117 by which the flow of current to and voltage across power supply 102 is regulated. As discussed above, this closed loop type of control is important in producing uniform, reproducible bonds.

Figure 9:
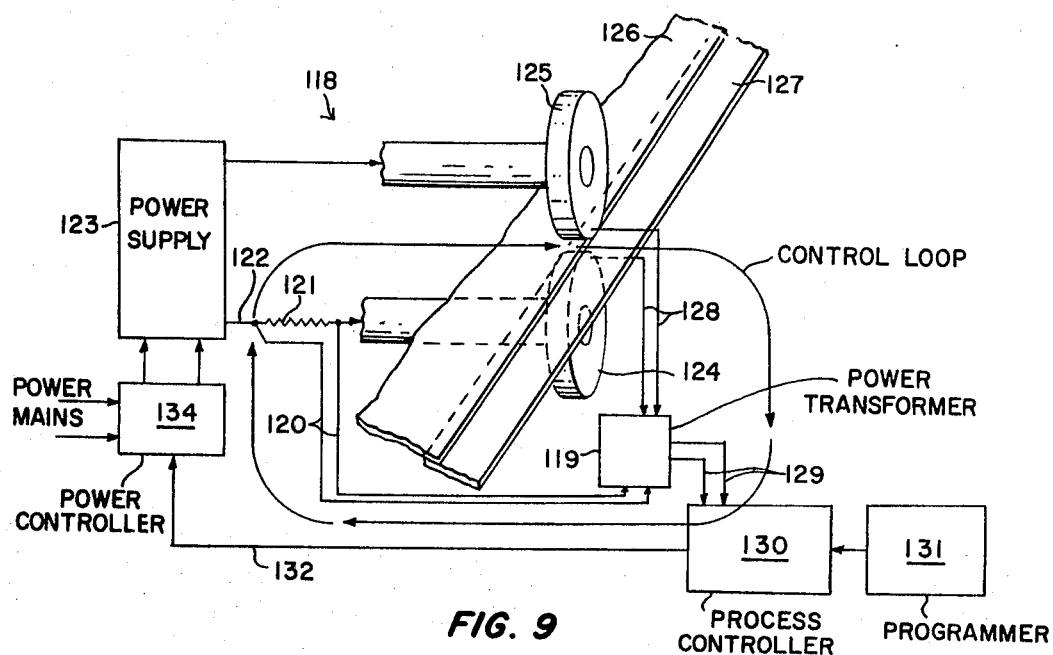
FIG. 9 is a schematic illustration of one form of control system for metallurgical bonding apparatus of the type contemplated by the present invention.

It is preferred, though not essential, that this control system employ a detector capable of measuring the power consumed in the bonding process. One suitable type of power responsive control system 118, illustrated in FIG. 9, includes a Hall effect power transducer 119 provided with inputs 120 connected across a known resistance 121 shown in the conductor 122 connecting power supply 123 to the lower electrode 124 of an electrode pair 124, 125 between which the components 126 and 127 being joined move. Inputs 120 produce in the power transducer a voltage signal indicative of the current flow through resistance 121 and hence through the components 126 and 127.

A second pair of inputs 128 connected to lower electrode 124 and upper electrode 125 produce in the transducer a signal indicative of the voltage drop across the electrodes. The output from the transducer is a continuous signal which is the product of the two input signals and is proportional to the power consumption.

This signal is fed through outputs 129 into a conventional process controller 130 such as a Research, Inc., "Thermac Model PC 5192," which is set to maintain the power level at which the desired bonding conditions are obtained by a programmer 131 such as a Research, Inc., "Data-trak Model 411.01."[2] ([2]Process controller 130 can alternately be manually set, if desired.) Process controller 130 is connected through output 132 to an SCR power controller 134 such as a LPAC-3-408-207 and regulates the power which is supplied by the latter to power supply 123, increasing the power output as the power consumption across the electrodes decreases below the preset power level and reducing it as power consumption rises above the present level.

All of the components employed in the novel control system 118 described above are commercially available items, and all operate in the customary fashion. Accordingly, it is not believed that a more detailed description of the control system components is required herein.

Referring now to FIGS. 16–18, reference character 136 identifies an I-beam which may be produced by simultaneously bonding caps or flanges 138 and 140 to web 142 by metallurgical bonding apparatus 58 in accordance with the principles with the present invention.

The initial steps in the process in which I-beam 136 is manufactured are the sizing and cleaning of the cap and web components. These components are assembled in suitable tooling. As illustrated in FIGS. 17 and 18, this may include members 144 and 146 on opposite sides of web 142 and cap screws 148 extending through member 146 and web 142 and threaded into member 144. The upper and lower edges of members 144 and 146 are rounded as at 150 to match the configuration of the fillets 151 which the finished I-beam is to have (see FIG. 38).

Referring now to FIG. 17, end caps 138 and 140 are then added and maintained in the proper position with respect to the web by vertically extending guide members 152 bolted or otherwise fixed to tooling members 144 and 146. This assembly is then fed between the electrodes of the bonding apparatus, joining the end caps 138 and 140 to web 142 and effecting plastic flow of the metal into contact with tooling members 144 and 146 to produce fillets 151 (see FIG. 38). The tooling is then unbolted, resulting in the structural member shown in FIG. 16. The manufacture of I-beams by the technique just described is illustrated in further detail in the following examples:

EXAMPLE I

A straight I-beam section having the following dimensions was made from 0.040 inch thick titanium alloy sheet (Ti-6Al-4V):

| | |
|---|---|
| Length | 24 inches |
| Height | 1 inch |
| Flange Width | 0.5 inch |
| Flange and web thickness | 0.040 inch |
| Fillet radii | 0.020 inch |

As discussed above, tooling (in this case made of mild steel) was clamped to opposite sides of the titanium web sheet to provide mechanical support for the web sheet. The tooling also localized heating in the areas being joined and provided a surface of controlled radius against which the I-beam fillets were formed.

The web extension (154 in FIG. 18) for this particular I-beam was 0.025 inch.[3] ([3]The web extension required for complete fillet formation depends primarily on web thickness and fillet size.) Flange strips 0.5 inch wide by 26 inches long, sheared from 0.040 inch titanium alloy sheet, were positioned along the opposite edges of the web sheet as shown in FIG. 17 by retainers or guides 152 as described above to align the flanges with the web.

The components of the I-beam were then bonded together by passing the assembly between two molybdenum alloy electrodes in air. Heating, upsetting of the web extension, bonding, and fillet formation occurred progressively as the electrodes advanced along the length of the I-beam. The bonding parameters for this beam were:

500 pounds electrode squeeze force
1850° F. bond temperature
6 inches per minute peripheral electrode speed[4] ([4]As both caps or flanges were joined simultaneously to the web the bonding speed was actually 12 inches of joint per minute.)
8-inch diameter by 0.5 inch wide electrodes of TZM alloy The beam was then completed by separating the two halves 144 and 146 of the reusable tooling from the web. Except for trimming to the desired length, no subsequent machining or other finishing operations were required, which is of course an important attribute of the invention.

Mild steel tooling as described in Example I will prove satisfactory for most applications such as those involving the joining of titanium or titanium alloy parts. Better life, however, is obtained from alloy steel such as a tool steel or stainless iron such as type 430. Stainless steels of the 300 series may be used for bonding super alloy parts although they are generally unsatisfactory for the bonding of titanium since they expand excessively. Chromized steels have also shown excellent performance in the bonding of titanium parts. Tooling fabricated from still different materials may of course be employed in other applications depending upon the particular materials being joined and the bonding conditions. Copper is an example.

Other modifications may also be made in the tooling to produce increased performance. For example, a metallic foil may be inserted between the tooling and the parts supported thereby to reduce deterioration of the tooling and control the surface reaction of the parts being joined. Or a graphite coating may be baked onto the steel to reduce deterioration of the tooling.

The following examples illustrate an application of some of the options in tooling materials, etc., just discussed as well as the bonding of a different material and the fabrication of a sine wave I-beam.

EXAMPLE II

The method described in Example I and the preceding text was used to make a straight I-beam section from a nickel-base alloy (Inco 718) of approximate composition Ni-19Cr-18Fe-5Cb-3Mo-0.8Ti-0.6A1. The I-beam had the following dimensions:

| | |
|---|---|
| Length | 15 inches |
| Height | 2 inches |
| Flange width | 0.5 inch |
| Flange and web thickness | 0.055 inch |
| Fillet radii | 0.040 inch |

The tooling was of type 321 stainless steel and was clamped to the sides of the nickel alloy web as shown in FIG. 18 to provide mechanical support for the web sheet, to localize heating to the areas being joined, and to provide a nonreactive surface of controlled contour against which to form fillets. A molybdenum foil between the tooling and the parts being joined was used to insure complete lack of reaction. The tooling was 2 inches high by 0.25 inch thick.

The web and flanges were ground, etched, and given a nickel flash less than 0.0002 inch thick by electroplating. For this I-beam, the web extension was 0.040 inch.

The bonding parameters for this beam were:
1,750 pounds electrode squeeze force
2,150° F. bond temperature
5 inches per minute peripheral electrode speed
8 inch diameter by 0.75 inch wide electrodes of TZM alloy
Bonding was performed in argon

EXAMPLE III

Referring now to FIG. 26, a straight, uniform height I-beam 155 with flanges 156 and 157 and a web 158 in the form of a sine wave having the following dimensions was made from titanium alloy sheet:

| | |
|---|---|
| Length | 36 inches |
| Height | 2 inches |
| Flange width | 1 inch |
| Sine wave length | 2.5 inches |
| Wave amplitude | 0.56 inch |
| Flange and web thickness | 0.040 inch |
| Fillet radii | 0.020 inch |

This I-beam was made using the procedure of Example I, except for the following differences:
1. The titanium alloy web sheet was preformed in the shape of a sine wave prior to bonding.
2. The reusable tooling was made from two 0.25 inch thick by 2 inch wide bars of mild steel formed to the shape of mating sine waves. Each of these was reinforced on the outside surface with a 0.50 inch by 1 inch bar welded at the crest of each wave. The backup bars stiffened the tooling and provided flat surfaces for guidance purposes during bonding.

Apparatus of the type discussed above and illustrated in FIG. 3 may also be employed to produce more complex structures such as the double web box beam 159 illustrated in FIGS. 23 and 24 in which two parallel, spaced-apart webs 160 and 161 were bonded between facesheets 162 and 163. The fabrication of box beam 159 is described in more detail in the following example.

EXAMPLE IV

Double web box beam 159 was fabricated from titanium alloy and had the following dimensions:

| | |
|---|---|
| Length | 6.6 inches |
| Height | 1 inch |
| Width of facesheets | 3 inches |
| Spacing between webs | 2 inches |
| Facesheet and web thickness | 0.040 inch |
| Fillet radii | 0.020 inch |

The procedure followed was the same as that described in Example I except that:
1. Bonding was done in two passes, one for each web.
2. Each web was confined between a pair of tooling members 164 and 165 by bolts 166, and the webs were maintained in spaced apart relationship by a horizontal spacer 167 into which bolts 166 were threaded.

After the bonding passes were completed the tooling was removed by taking out bolts 166, slipping out spacer 167, and then separating tooling members 164 and 165 from the webs.

The novel apparatus by which the structures described above were made may be modified in may way, some of which were mentioned above. The following examples and the ensuing text describe an equally important modification in this apparatus:

EXAMPLE thick

A straight I-beam (identified by reference character 220 in FIG. 25) having flanges 222 and 224, a web 226, and a linear taper of web height along its length with the following dimensions was made from 0.040 inch tick titanium alloy sheet:

| | |
|---|---|
| Length | 60 inches |
| Height | 4⅝ to 2¼ inches |
| Flange width | 1 inch |
| Flange and web thickness | 0.040 inch |
| Fillet radii | 0.020 inch |

This tapered I-beam was made using the procedures described in Example I except for the following differences: (1) the reusable mild steel tooling 228 (see FIG. 19) was in the form of a taper; (2) because of the greater height to width ratio of this beam, laterally biased rotatable supports or rolls 229 and 230 were used during the bonding operation to align and guide the beam as it passed between the electrodes of the machine in the manner illustrated in FIG. 19. Bonding conditions were the same as those described in Example I.

In conjunction with the preceding example, because of the novel manner in which the electrodes are biased against the components of a tapered beam of the type illustrated in FIG. 25 as it is fabricated, constant pressure is exerted on the parts being joined despite the increase in the width or depth of the web as the flanges are joined to it, and the novel feedback-type control system of the invention automatically keeps the bonding temperature uniform despite the taper in the web. Moreover, by the use of the differential drive mechanism described above, the surface speed of the two electrodes may be matched to the surface speeds of the flanges despite the fact that these are different as the parts being joined pass between the electrodes. The result is a high degree of uniformity in the joint areas.

The versatility of the novel bonding technique as just described is further demonstrated by the bonding of arcuate flanges 231 and 232 to an annular web 233 to produce the novel curved I-beam 234 illustrated in FIG. 22. The manner in which beam 234 was fabricated is described in more detail in the following example:

EXAMPLE VI

Curved beam 234 was made from a titanium alloy and had the following dimensions:

| | |
|---|---|
| Length of outer flange | 32 inches |
| Length of inner flange | 29 inches |
| Height of section | 2 3/16 inches |
| Flange width | 1.0 inch |
| Flange thickness | 0.080 inch |
| Web thickness | 0.040 inch |
| Fillet radii | 0.030 inch |
| Radius curvature of outer flange | 24 inches |

This curved beam was made using the procedure described in Example I except for the following differences:

1. The tooling (reusable mild steel) was in the form of a 90° segment of an annulus having a 48 inch outside diameter and a 44 inside diameter.
2. The web extension was increased to 0.028 inch to accommodate the larger fillet radii.
3. Lateral rolls as illustrated in FIG. 19 were used during bonding to align and guide the curved beam as it passed between the electrodes of the bonding apparatus.
4. The same wheel speed (6 inches per minute) as Example I was used on the concave inside flange, but a 6.6 inch per minute wheel speed was used on the convex outer flange because of its greater length.

The technique described in Example V may also be used to fabricate more complex structures such as the rib-stiffened panel 236 illustrated in FIG. 27, as shown by the following example:

EXAMPLE VII

Rib-stiffened panel 236 has a flat facesheet 238 reinforced with two ribs 240 and 242 that taper both in height and in spacing along the length of the panel. Additional stiffness was provided by attaching caps 244 and 246 to the ribs. The panel dimensions were:

| | |
|---|---|
| Length of facesheet | 12 inches |
| Width of facesheet | 5¼ to 4¾ inches |
| Thickness of facesheet and rib caps | 0.160 inch |
| Height of ribs | 2.6 to 2.1 inches |
| Width of rib caps | 1 inch |
| Thickness of ribs | 0.125 inch |
| Spacing between ribs | 2¾ to 2¼ inches |

Panel 236 was made without the use of tie bolts through the tooling and ribs. Reusable, mild steel tooling was clamped against the ribs by side rolls as shown in FIG. 19, which were biased against the tooling by pneumatic actuators in a manner similar to that described hereinafter in conjunction with the apparatus illustrated in FIG. 4. The rib material extension required for fillet formation in this panel was 0.045 inch. Bonding was done in two passes, one pass for each rib. Bonding parameters were the same as in Example I except that the electrode squeeze force was increased to 1,800 pounds.

EXAMPLE VIII

A tapered I-beam similar to that illustrated in FIG. 25, but having a double web was made from titanium alloy sheet. The beam had the following dimensions:

| | |
|---|---|
| Length | 60 inches |
| Height | 4⅝ to 2¼ inches |
| Flange Width | 1 inch |
| Flange and Web Thickness | 0.040 inch |
| Fillet Radii | 0.020 inch |
| Spacing Between Webs | 0.19 inch |

This double-web tapered I-beam was made by the tooling and procedures of Example V except for the following differences:

1. An additional mild steel tool 0.19-inch thick was placed between the two webs to control web spacing. This additional tooling was removed from the beam after bonding by etching with acid.
2. The 0.19-inch spacing of the webs permitted the four joints to be made with a single bonding pass of the 0.50-inch wide molybdenum electrodes of the machine.
3. A squeeze force of 1,000 pounds was used because of the two webs of 0.040-inch material.

Figure 4:
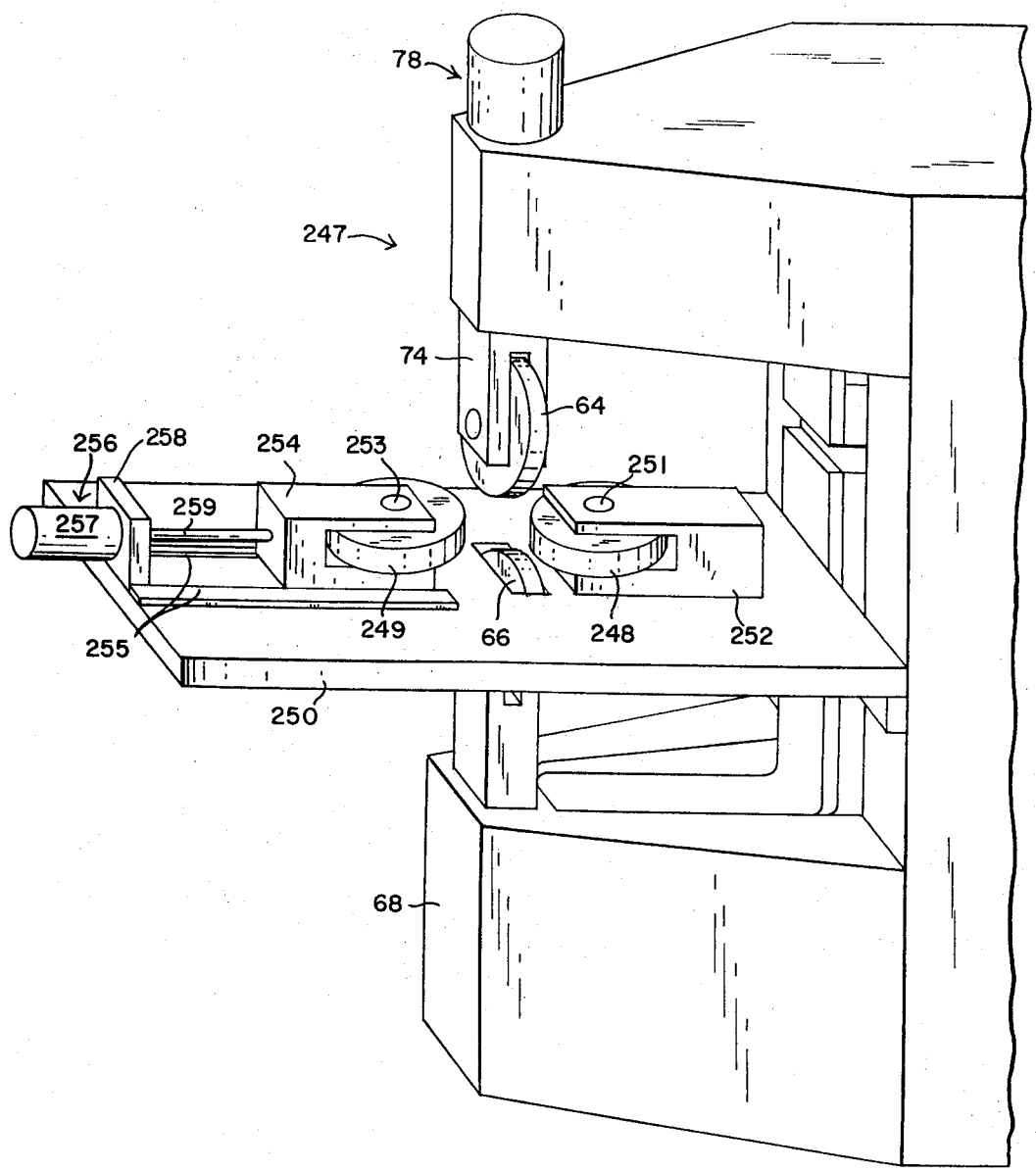
FIG. 4 is a pictorial view of a second form of metallurgical bonding apparatus in accord with the present invention.

In conjunction with the preceding Example, FIG. 4 illustrates metallurgical bonding apparatus 247 equipped with lateral support rolls 248 and 249 of the type shown in FIG. 19 and is one of many forms which apparatus of the present invention so equipped may take. This apparatus differs from that illustrated in FIG. 3 primarily in the addition of a horizontally oriented table 250 on which the rotatable support members 248 and 249 are mounted.

More specifically, in the illustrated apparatus, support member 248 is rotatably supported from table 250 by a vertical shaft 251 journaled in a bracket 252 rigidly fixed to the table. Support member 249 is similarly supported by a shaft 253 journaled in bracket 254. This bracket is supported for movement in a rectilinear path toward and away from support member 248 on table 250 by guides 255.

In the process cycle, support member 249 is biased against the part disposed between it and support member 248 with a force of predetermined magnitude as by a fluid-actuated motor 256 including a cylinder 257 fixed to table 250 by bracket 258 and a connecting rod 259 fixed to slidably mounted bracket 254.

It will be apparent that apparatus of the type illustrated in FIG. 4 may be employed without the bolt-on tooling described in the preceding EXAMPLES where circumstances warrant. In the formation of a T-joint such as occurs in the fabrication of an I-beam, for example, the vertically oriented web would be embraced directly by the rotating guide members, and suitable vertical guides such as those identified by reference character 152 in FIG. 17 would be affixed to the table 250 of the welding apparatus to maintain the member being joined to the web aligned with it as the parts pass between the rotatable electrodes of the apparatus (identified by reference characters 64 and 66 in FIG. 4).

Figure 5:
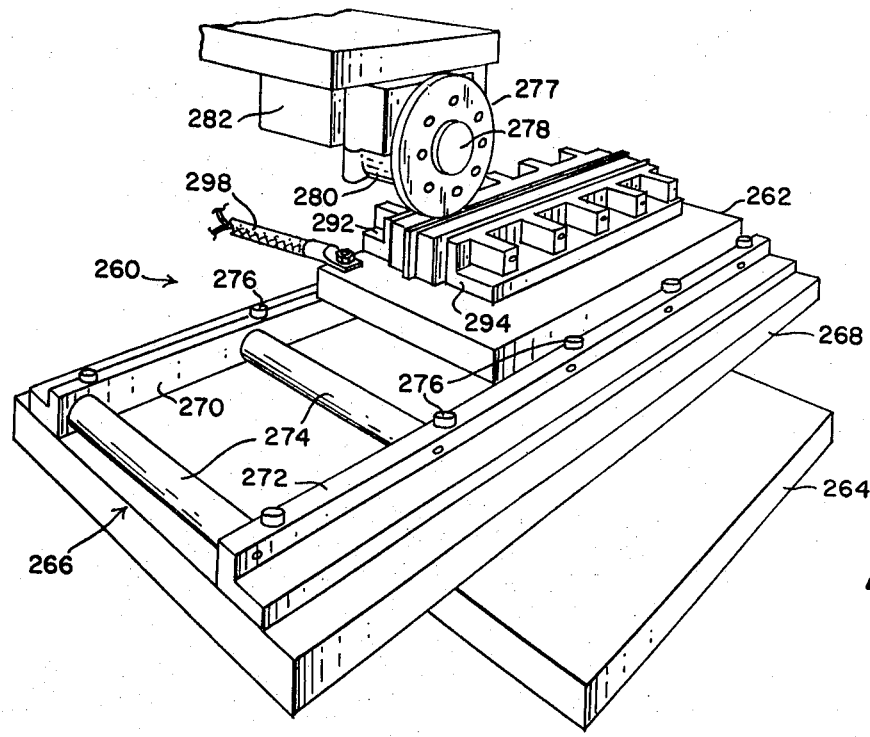
FIG. 5 is a pictorial view of a third form of metallurgical bonding apparatus contemplated by the present invention.

Referring now to FIG. 5, reference character 260 identifies a further form of metallurgical bonding apparatus contemplated by the present invention. This embodiment of the invention differs from that illustrated in FIG. 3 in that the lower, rotatable electrode has been replaced by a rectilinearly movable table 262 on which the parts being joined are mounted. More specifically, table 262 is supported from the frame of the machine (identified generally by reference character 264) on a roller conveyor 266 including a base 268 on which longitudinally extending supports 270 and 272 are mounted. Journaled between supports 270 and 272 are spaced-apart rollers 274 on which table 262 is disposed. Rotatable guides 276 disposed at intervals along supports 270 and 272 confine table 262 to rectilinear movement relative to electrode 277.

In this embodiment of the invention a differential drive mechanism is not required since there is only one rotating electrode. Accordingly, it may employ the illustrated alternate embodiment in which electrode 277 is fixed to the output shaft 278 of an electrical motor 280. Motor 280 is supported from a slide 282 mounted for vertical movement relative to table 262 in any desired fashion and biased toward the table by the same type of arrangement as employed in bonding apparatus 58 of FIG. 3.

Metallurgical bonding apparatus of the type illustrated in FIG. 5 may be employed, as an example, to fabricate T-sectioned members of the type identified by reference character 284 in FIGS. 20 and 21. As shown in detail in FIG. 20, member 284 is fabricated by bonding two cap or flange members 286 and 288 to a web member 290. This method of forming a T-joint may, in some applications, be more advantageous than the method described heretofore (see, for example, Example I and FIG. 18) in that there may be a more limited deformation of the components being bonded, less metallurgical degradation in the joint area, and greater joint strength.

In forming a T-joint from three components as shown in FIG. 20, tooling 291 of the type illustrated in FIG. 17 may be employed. The parts to be bonded and the tooling are supported from movable table 262 between longitudinally extending supports or guides 292 and 294 bolted or otherwise fixed to the table.

In the bonding process pressure is exerted on the components being bonded by rotatable electrode 277 in the direction shown by arrows 296 in FIG. 20. Simultaneously, as in the embodiments of the present invention discussed above, the components are heated to a predetermined temperature by completing an electrical circuit from the electrode through them. In this embodiment of the invention the electrode 277 is connected to one side of the electrical power source as in the embodiments of the invention described above. The circuit is completed by connecting the other side of the power source to table 262 through a conductor identified by reference character 298 in FIG. 5.

The following Example illustrates in somewhat more detail the fabrication of components by the process just described:

EXAMPLE IX

Two test structures using the concept illustrated in FIG. 20 were layed up and successfully bonded using the techniques described herein. All three parts for the first structure were made from 0.040 inch titanium alloy (Ti-6Al-4V) 1 inch wide. Sheets one and two for the second joint were made from 0.016 inch Ti-6Al-4V alloy 1 inch wide. The radii of the inside fillets on the T-joints were about 0.025 inch.

Both structures were bonded without appreciable distortion.

Three tensile samples were selected from the first structure, one from each end and one from the center.

The tensile samples were loaded in a direction normal to the joint surface. Two of the samples were tested with the leg or web 290 still in place while the leg was removed from specimen three prior to testing. The results of these tests are shown below:

| Spec. No. | Failure Stress | Failure |
|---|---|---|
| 1 | 115 k.s.i. | Failed by joint separation |
| 2 | 142 k.s.i. | Failed in joint area with parent material pull out |
| 3 | 141 k.s.i. | Failed outside joint area |

Figure 6:
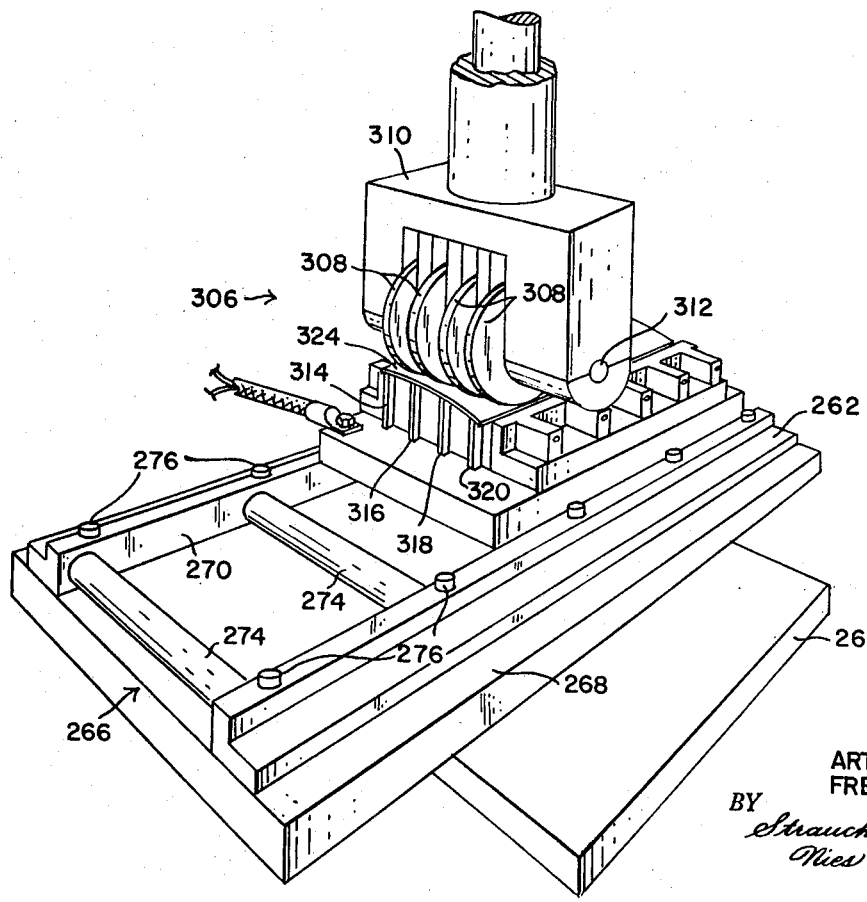
FIG. 6 is a pictorial view of a fourth form of metallurgical bonding apparatus contemplated by the present invention.

FIG. 6 depicts metallurgical bonding apparatus 306 which is similar to that illustrated in FIG. 5 except that multiple electrodes 308 are supported from vertical slide 310 by transversely extending horizontal shaft 312. This type of arrangement may be advantageously employed to simultaneously form plural bonds as shown in FIG. 6 in which ribs or stiffeners 314–320 are being simultaneously bonded to face sheet 324.

Apparatus for forming multiple bonds may of course assume different forms[5]. ([5]Also, in both bonding apparatus 260 and bonding apparatus 306, the flexible conductive cables 298 may be replaced by conventional sliding or wheel type electrical contacts. These may prove advantageous in some applications of the invention.) For example, the electrodes may be arranged in tandem rather than on a single supporting shaft 312 as shown in FIG. 6. The latter arrangement may be preferred for some applications as it lends itself to independent temperature and pressure control for each of the multiple electrodes, permitting these to be optimized at each of the joint locations.

As a further example, three appropriately arranged electrodes may be employed to produce a triangular structure. And both vertically and horizontally biased electrodes may be employed to simultaneously produce bonds along a side or sides and top and/or bottom of a member.

The rib-stiffened panel 236 of FIG. 27 is another type of structure that may be readily fabricated in metallurgical bonding apparatus of the type illustrated in FIG. 6 to eliminate the necessity of making multiple passes as described in Example VI. The tapered double web I-beam described in Example VIII and the box beam 159 illustrated in FIG. 23 are examples of other structures which the apparatus of FIG. 6 may be advantageously used to fabricate.

Turning now to FIGS. 7 and 8, metallurgical bonding apparatus 330 is designed for the fabrication of structures such as I-beams having an arcuate web. Bonding apparatus 330, which is only partially illustrated in FIG. 7, differs from the bonding apparatus 58 of FIG. 3 first by the addition of a table 334.

Supported from table 334 by a vertically extending shaft 336 is a rotatable segmented type inner tooling member 338. In the formation of an I-beam 339 (see FIG. 8) of the type for which bonding apparatus 330 is designed, the web 340 is confined between tooling member 338 and outer, annular tool member 342 by bolts or other fasteners (not shown). In addition, suitable guide members (likewise not shown) are provided to align upper and lower flanges 344 and 346 relative to web 340 as the beam components pass between pressure exerting upper and lower electrodes 348 and 350. These tooling members may be fabricated of the materials described above and may be configured to provide fillets on or otherwise control the external configuration of the structure being formed.

In the apparatus illustrated in FIGS. 7 and 8, shaft 336 may be driven to effect movement of the beam components between upper and lower electrodes 348 and 350. Alternatively such movement may be produced by driving the electrodes. Similar drive arrangements may also be used in the other exemplary embodiments of the invention described above.

As will be apparent from the foregoing, the novel bonding apparatus of the present invention may take many different forms. The same is true of the control systems employed to regulate the operation of the apparatus.

Figure 10:
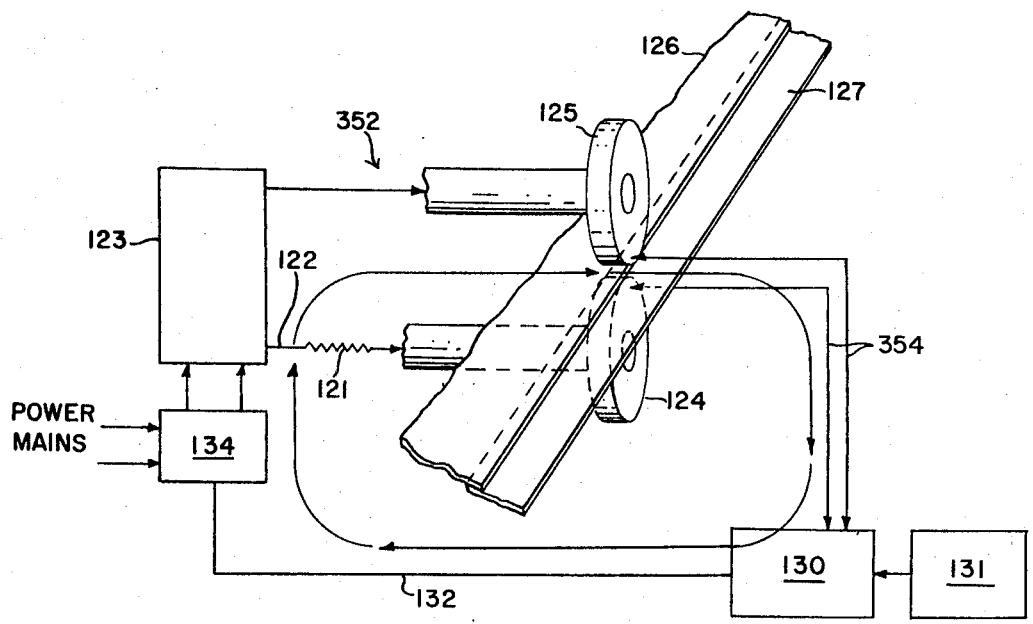
FIG. 10 is a schematic illustration of a second form of control system.

FIG. 10, for example, depicts a control system 352 in which the feedback signal is indicative of the voltage drop across the electrodes and the workpiece therebetween rather than the power dissipation thereacross as in the control system 118 described above. The inputs 354 to the process controller in this system are directly from electrodes 124 and 125 rather than from a power transducer as in the control system 118 described above and accordingly provide a signal indicative of the voltage drop across the electrodes rather than the dissipated power. The operation of the system is otherwise the same with process controller 130 regulating the operation of power controller 134 as the voltage signal derived from inputs 354 varies.

Figure 11:
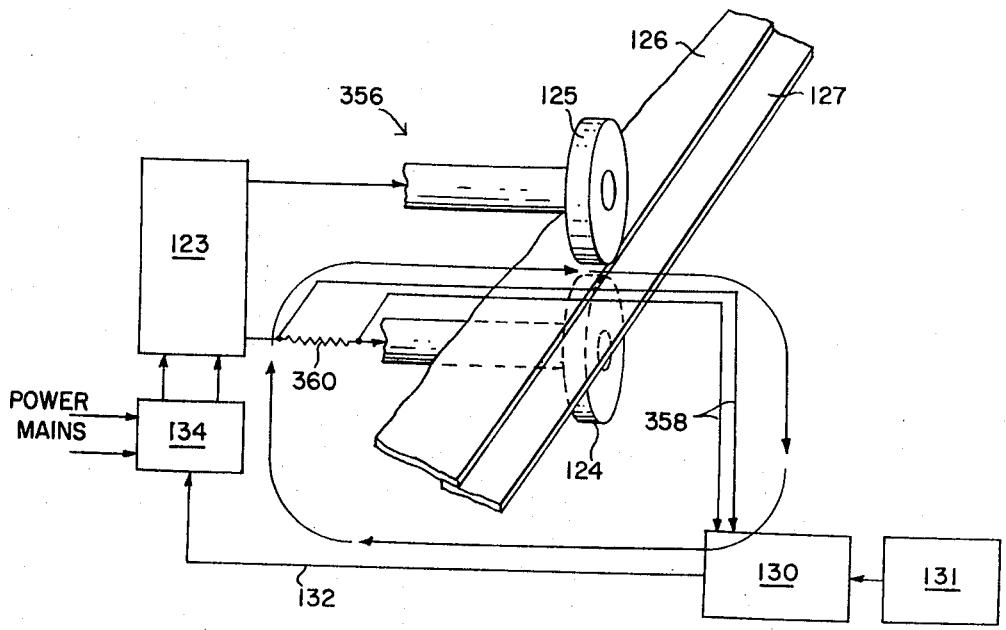
FIG. 11 is a schematic illustration of a third form of control system.

FIG. 11 depicts a third form of control system 356 similar to those described above except that the magnitude of current flow rather than power consumption or voltage drop is monitored to produce the feedback signal. In this case inputs 358 to process controller 130 are connected across known resistance 360 in the electrode circuit to produce a signal indicative of the magnitude of current flow. As the level of this signal varies, process controller 130 regulates power controller 134 as described above to maintain the flow of current at the desired level.

Control of bonding conditions by current control is one of the simplest and easiest methods of maintaining specified bonding conditions. This technique may be employed with both AC and DC power supplies. (For AC power supplies the known resistance 360 is replaced with a current transformer).

Figure 12:
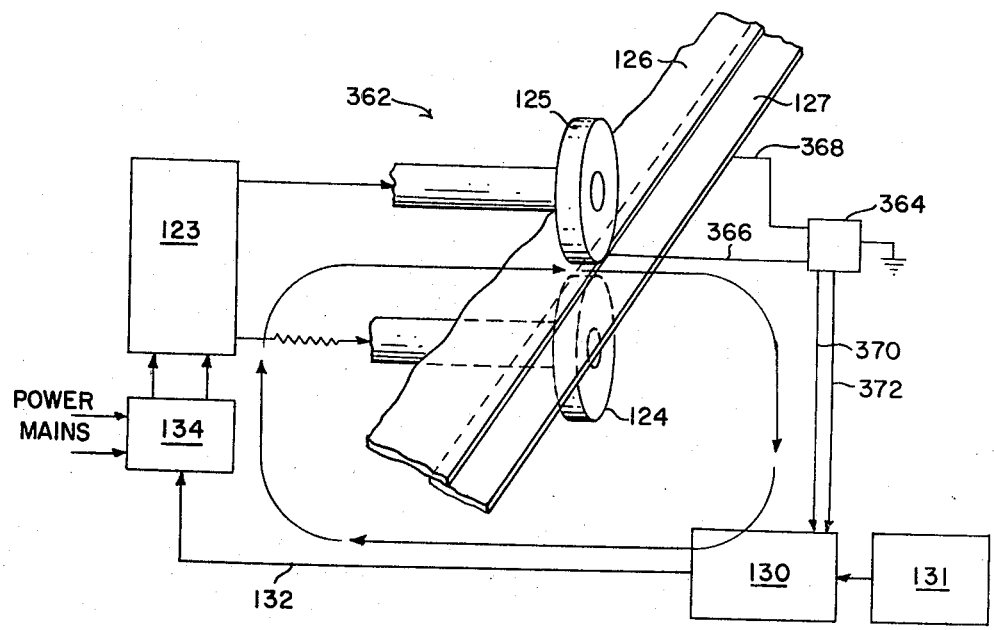
FIG. 12 is a schematic illustration of a fourth form of control system.

FIG. 12 illustrates a fourth form of control system 362 which may be employed when the power supply is of the AC type. This system depends for operation upon the thermoelectric potential existing between the material constituting the electrodes 124 and 125 and the dissimilar material of components 126 and 127 being joined (the thermoelectric potential for the material combination varies as the bonding temperature changes and is therefore indicative of the bonding temperature). In system 362 this potential is detected by a conventional filter network 364 having inputs 366 and 368 connected to part 127 and electrode 124, respectively.

Filter network 364 removes the AC component from the potential across inputs 366 and 368 so that the feedback signal transmitted to process controller 130 by outputs 370 and 372 is a continuous DC signal indicative of the bonding temperature. From this point control system 362 operates in the manner described previously to regulate the bonding temperature.

Figure 13:
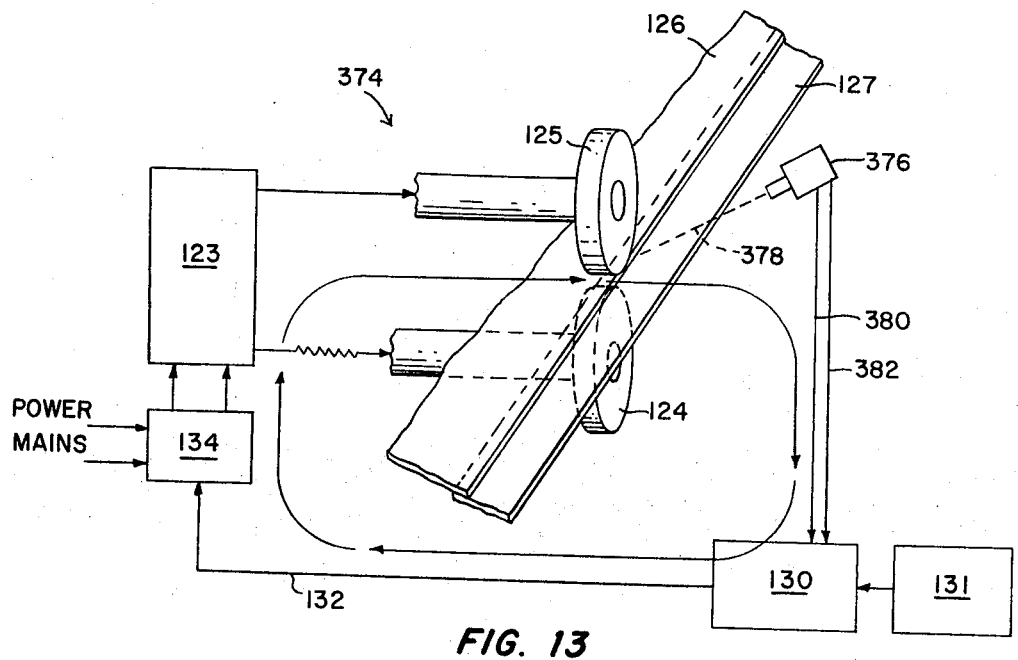
FIG. 13 is a schematic illustration of a fifth form of control system.

Referring now to FIG. 13, the feedback signal indicative of the bonding temperature may also be generated by an optical pyrometer as in control system 374. The pyrometer 376 employed in this system is preferably one having a small target area such as an Ircon Model 300. Use of such a pyrometer avoids the necessity of employing filter networks to remove unwanted electrical signal components.

Pyrometer 376 is sighted at the intersection between upper electrode 125 and the part 126 against which it is biased. Line 378 in FIG. 13 identifies the line-of-sight of the pyrometer.

The output signal from the pyrometer is conducted via inputs 380 and 382 to process controller 130 as in the systems described previously. And the operation of the system from this point on is identical to those of the previously described control system embodiments.

Figure 14:
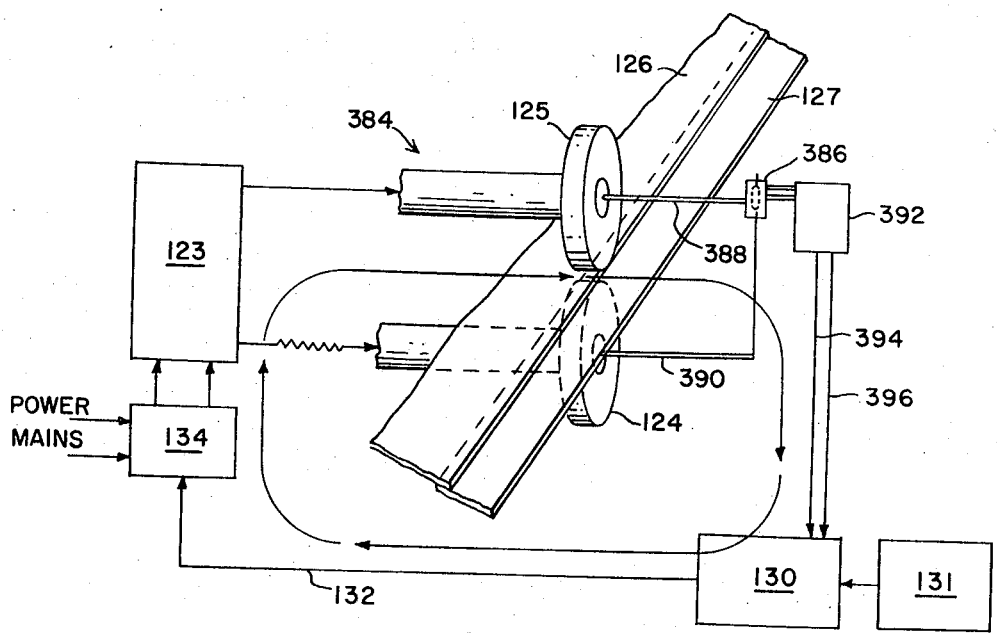
FIG. 14 is a schematic illustration of a sixth form of control system.

In the type of metallurgical bonding process disclosed herein there is a controlled movement of the parts toward each other as the bond is established although this is offset to a variable extent by thermal expansion of the workpiece. Since the magnitude of thermal expansion is indicative of the temperature of the workpiece, and therefore of the temperature in the bonding area, the displacement may also be monitored to produce a feedback signal for controlling the bonding temperature. A control system 384 of this type is illustrated in FIG. 14. In system 384 the displacement is detected by a conventional transducer 386 such as a linearly variable differential transformer connected to electrodes 124 and 125 by diagrammatically illustrated mechanical inputs 388 and 390. Transducer 386 converts physical movement to a modulated electrical signal which is demodulated by a conventional demodulating circuit 392 to produce a continuous DC feedback signal indicative of electrode position, which for a given speed and force is also indicative of the bonding temperature. This signal is transmitted to process controller 130 through inputs 394 and 396, the control system from this point accordingly operating in the same manner as those described previously.

FIG. 15 illustrates a control system 398 which combines regulation of the bonding temperature with inspection of the bond quality. Specifically, it is well known that the quality of a bond between two parts can be determined by measuring energy in the ultrasonic range reflected from the bond line.

Control system 398, which takes advantage of this phenomenon, employs an ultrasonic system 400 such as that manufactured by Panametrics. This system includes a unit 402 for producing a known energy input into ultrasonic generator 404 through lead 406. The energy reflected from the bond line between the parts being joined will decrease as the quality of the bond increases from a maximum when there is no bond to essentially zero for a perfect bond. The reflected energy is detected by transducer 408 which transmits a signal indicative of the level of reflected energy to unit 402 via input 410. Unit 402 compares the level of the energy level received from transducer 408 with that transmitted to generator 404 and produces an output signal indicative of the bond quality. This signal is transmitted via inputs 412 to process controller 130 which accordingly operates in the manner described above to so regulate the supply of power to electrodes 124 and 125 as to maintain optimum bonding conditions.

As will be readily apparent to those conversant with the relevant arts, other techniques of detecting bonding conditions may be employed and other components may be utilized to complete the control loop. Therefore, the illustrated and described control system embodiments are to be considered as merely illustrative of those which may be employed.

We have described numerous embodiments of the novel bonding apparatus and techniques contemplated by the present invention. These may be employed to fabricate a wide variety of structures as is apparent from the examples included above. They may also be employed to produce articles differing considerably from the structural members described above such as closures at the ends of tubes and lap joints for joining tubes together as well as members of the type shown in FIG. 26. As a further example, the techniques described herein may be utilized to produce reinforced metal tapes of the type identified by reference character 414 in FIG. 29. The process by which tape 414 was made is described in more detail in the following examples.

EXAMPLE X

Tape 414 is a titanium-boron composite containing 30 boron filaments. Three foils 416, 418, 420 of 0.003 inch thick Ti75A titanium (see FIG. 28) were employed with central foil 418 being provided on both sides with grooves 422 0.004 inch in diameter on centers 0.006 inch apart. The grooves were offset 0.003 inch on one side of the foil.

Fifteen boron filaments 424 were fed into the grooves on each side of the center foil 418 and the two cover foils 416 and 420 were added. This stackup was fed into bonding apparatus of the type described above which had 0.5 inch wide by 5 5/16 inch diameter molybdenum electrodes. Programmed current was passed through the stackup, which reached a temperature of 1,800° to 1,850° F.; and a force of 125 pounds was applied to the electrodes. Bonding was performed at a speed of 5.5 inches per minute.

The titanium-boron tape was trimmed to a width of 0.110 to 0.115 inch and had a thickness of 0.0130±0.0003 inch. The tape had a strength of 143,000 p.s.i. and an elastic modulus of 27 million p.s.i.

EXAMPLE XI

Reinforced tapes fabricated as described in the preceding Example were bonded to opposite sides of a Ti-6Al-4V alloy strip by the metallurgical bonding techniques described herein, giving a reinforced beam 0.085 by 0.448 by 10 inches. This beam had a specific stiffness 70 percent higher than an unreinforced titanium alloy beam of the same dimensions.

As suggested in the preceding examples, pregrooving of the metallic strips is helpful in the manufacture of composite structures such as reinforced tapes as an aid in locating the reinforcing filaments. This location technique is, however, not essential; and other locating techniques may instead be employed, if desired.

As a further illustration of the versatility of the present invention, attention is directed to FIGS. 30–32, which depict the steps involved in producing a unitary structure 426 having longitudinally extending passages 428 of a specified cross section therein. A structure of this type may be produced in accord with the techniques herein described by assembling inserts 430 having the configuration of the desired passages and preferably formed of a material such as mild steel between platelike members 432 and 434, these components being maintained in assembled relationship in any desired manner.

The assemblies thus produced are then passed between rotatable, biased electrodes 436 and 438 of the type described previously; and, programmed current is caused to flow between the electrodes to form a bond between members 432 and 434 in the manner described above and join them into a unitary structure. Acid etching or a similar technique is then employed to remove inserts 430 and form passages 428.

The technique illustrated in FIGS. 30–32 and just described may also be employed to advantage in the production of structures such as fan blades for turbine engines, etc., in which current bonding methods such as brazing are not acceptable because of electrogalvanic action.

FIG. 34 illustrates in fragmentary form a leading edge component 440 for an aircraft wing. This is illustrative of another type of structure which may be formed by the novel bonding techniques disclosed herein.

Heretofore, such members have been made by bending the material into a specified configuration and fusion welding the exposed edges of the material together over a filler piece as shown in FIG. 33 in which the weld line is identified by reference character 442. In forming comparable structures in accord with the principles of the present invention the forming step is followed by effecting movement of the formed member relative to a pressure exerting, heated, current-transmitting electrode as described above to form a diffusion bond between the free edges of the formed member. The advantages of forming components of the type just described by the present invention over the process by which they have heretofore been formed include lower cost, absence of porosity and cracks, and lack of heat effected degradation of metallurgical properties in the bonding zone.

The versatility of the present invention is also evidenced by the fact that it can be employed to form members without bonding. This aspect of the invention is exemplified in the following example:

EXAMPLE XII

The edge of a sheet 444 (see FIG. 39) was upset to produce a member 446 having the cross-sectional configuration shown in FIG. 40. Sheet 444 was of 0.055 inch nickel-base alloy (Inconel 718 of approximate composition Ni-19Cr-18FE-5Cb-3Mo-0.8Ti-0.6Al) and was clamped between mild steel tooling members 448 and 450 having the configuration shown in FIG. 39. The tooling dimensions were:

| | |
|---|---|
| Thickness | 0.375 inch |
| Recess Width | 0.125 inch |
| Recess Depth | 0.055 inch |
| Recess Radius | 0.050 inch |

The part was passed between the electrodes of the machine with current programmed to give constant conditions. Forming parameters were:

| | |
|---|---|
| Force | 2,000 pounds |
| Temperature | 2,100° F. |
| Speed | 5.5 inch per minute |
| Radius formed | 0.035 to 0.045 inch |
| Electrodes | 0.625 by 8-inch dia. TZM |

For the most part, the working examples included above deal with the fabrication of unitary structures from titanium alloys. As expressly mentioned above and as will be apparent to those conversant with the relevant arts, however, the present invention is by no means limited nor finds utility only in the bonding of this type of material. Many other materials, which can by heretofore employed techniques only be bonded with difficulty, if at all, can also be readily joined by the techniques of the present invention. These include, by way of example only, beryllium, columbium alloys, dispersion strengthened and nickel-chromium alloys in addition to that described in Example II above, heat resistant alloys such as Hastelloy X, and super alloys such as Inco 718.

Exemplary embodiments of the present invention have been illustrated and described above, and many modifications of the exemplary apparatus and techniques have been suggested. Other variations both in the bonding process and in the apparatus in which it is carried out will readily occur to those conversant in the relevant arts. To the extent that such modifications are not expressly excluded from the appended claims, they are accordingly fully intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A dynamic diffusion bonding type method of joining two or more metallic members into a unitary structure by forming a continuous bond therebetween, comprising the steps of:
   a. maintaining the members to be joined in abutting relationship between a supporting means and a rotatable electrode to provide a faying surface therebetween, said electrode and said supporting means being located on opposite sides of the faying surface between the members being joined;
   b. exerting a localized pressure on successive increments of said members by biasing said electrode toward the member contacted thereby and concomitantly effecting relative movement between the members and the rotatable electrode;
   c. simultaneously with the exertion of said localized pressure, locally heating the portions of the members on which the pressure is exerted by passing an electrical current from said electrode through the members being joined to the supporting means; and
   d. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to insure essentially complete metal-to-metal contact between said members along said faying surface and thereby permit a diffusion of atoms of the materials of which said members are composed across said faying surface which will produce a continuous bond between said members.

2. The method of claim 1, wherein the members being joined are composed at the faying surface of a material having an oxide film thereon and wherein the members are caused to flow in the regions adjacent the faying surface to an extent sufficient to rupture said film and thereby insure that there is metal-to-metal contact between the members at the faying surface.

3. The method of claim 1, wherein at least two of the members to be joined are made of dissimilar materials, whereby a composite unitary structure is produced.

4. The method of claim 1, together with the step of disposing a foil of a dissimilar metallic material between the members to be joined to improve the character of the bond therebetween.

5. The method of claim 1, together with the step of coating at least one of the members to be joined with a metallic material to improve the character of the bond between said members.

6. The method of claim 1, together with the steps of confining the members being joined between tooling components located on opposite sides of the members and generally between said electrode and said supporting means to maintain said members in said abutting relationship and the step of disposing foil between said members and said tooling components to prevent reactions between said members and said components.

7. The method of claim 1, wherein the members being joined are composed of materials having the same or similar chemical compositions.

8. The method of claim 1, wherein the members being joined are fabricated from materials selected from the group consisting of superalloys and titanium, nickel, beryllium, and their alloys.

9. The method of claim 1, wherein the rotatable electrode is composed of molybdenum or a molybdenum-based alloy.

10. A dynamic diffusion bonding-type method of joining two or more members composed of titanium alloy into a unitary structure by forming a continuous bond therebetween, comprising the steps of:
  a. maintaining the members to be joined in abutting relationship between a supporting means and a rotatable electrode, to provide a faying surface therebetween, said electrode and said supporting means being located on opposite sides of the faying surface between the members being joined;
  b. exerting a localized pressure on successive increments of said members by biasing said electrode toward the member contacted thereby and concomitantly effecting relative movement between the members and the rotatable electrode;
  c. simultaneously with the exertion of said localized pressure, locally heating the portions of the members on which the pressure is exerted in a manner such that the temperature in the regions of the members in and contiguous to that in which the bond is formed will not exceed about 2,300° F. by passing an electrical current from said electrode through the members being joined to the supporting means; and
  d. so regulating the current density through the members being joined as to maintain the maximum temperature of each of said members below the melting point of the alloy of which said member is composed and thereby prevent melting of the members but high enough to exceed the yield stress of the alloy from which each said member is fabricated at the pressure exerted by the electrode in a region contiguous to the faying surface and opposite the line of contact between the electrode and the member contacted thereby to thereby produce sufficient localized plastic flow of each of the members being joined to insure essentially complete metal-to-metal contact between said members along said faying surface and thereby permit a diffusion of atoms of the alloys of which said members are composed across said faying surface which will produce a continuous bond between said members.

11. A dynamic diffusion bonding type method of joining two or more metallic members into a unitary structure by forming a continuous bond therebetween in which at least one of the members to be joined has opposed edge portions and in which the distance between said opposed portions varies longitudinally of the member, said method comprising the steps of:
  a. maintaining the members to be joined in a fixed relationship between a supporting means and a rotatable electrode with the member to be joined to said one member abutting one of said edge portions of said one member to thereby provide a faying surface between said edge portion and the member abutted thereagainst, said electrode and said supporting means being located on opposite sides of the faying surface between the members being joined;
  b. exerting a localized pressure on successive increments of said members by biasing said electrode toward the member contacted thereby and concomitantly effecting relative movement between the members and the rotatable electrode, said pressure being maintained substantially uniform as said members move relative to said electrode despite the changes in the distance between the opposed edges of said one of said members;
  c. simultaneously with the exertion of said localized pressure, locally heating the portions of the members on which the pressure is exerted by passing an electrical current from said electrode through the members being joined to the supporting means; and
  d. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to insure essentially complete metal-to-metal contact between said members along said faying surface and thereby permit a diffusion of atoms of the materials of which said members are composed across said faying surface which will produce a continuous bond between said members which is uniform throughout its length despite the changes in the distance between the opposed edge portions of said one of said members.

12. A dynamic diffusion bonding type method of joining two or more metallic members into a unitary structure by forming a continuous bond therebetween, comprising the steps of:
  a. maintaining the members to be joined in abutting relationship between a supporting means and a rotatable electrode to provide a faying surface therebetween, said electrode and said supporting means being located on opposite sides of the faying surface between the members being joined;

b. exerting a localized pressure on successive increments of said members by biasing said electrode toward the member contacted thereby and concomitantly effecting relative movement between the members and the rotatable electrode;

c. simultaneously with the exertion of said localized pressure, locally heating the portions of the members on which the pressure is exerted by passing an electrical current from said electrode through the members being joined to the supporting means; and d. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to insure essentially complete metal-to-metal contact between said members along said faying surface and thereby permit a diffusion of atoms of the materials of which said members are composed across said faying surface which will produce a continuous bond between said members;

e. the temperatures in the region in which the bond is formed and in the regions contiguous thereto being maintained essentially uniform as the members move relative to the rotatable electrode by generating a feedback signal indicative of the temperature in the region in which the bond is formed and so controlling the magnitude of the current density by said signal as to maintain said temperature at a selected level.

13. A dynamic diffusion bonding type method of joining two or more metallic members into a unitary structure by forming a continuous bond therebetween, comprising the steps of:

a. maintaining at least two platelike members to be joined in abutting relationship between a supporting means and a rotatable electrode with a longitudinally extending side of one member abutting a longitudinally extending edge of a second member to provide a faying surface therebetween, said electrode and said supporting means being located on opposite sides of the faying surface between the members;

b. exerting a localized pressure on successive increments of said members in a direction normal to and at least partially spanning said faying surface by biasing said electrode toward the member contacted thereby and concomitantly effecting relative movement between the members and the rotatable electrode;

c. simultaneously with the exertion of said localized pressure, locally heating the portions of the members on which the pressure is exerted localized heating being effected by passing an electrical current from said electrode through the members being joined to the supporting means; and d. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to insure essentially complete metal-to-metal contact between said members along said faying surface and thereby permit a diffusion of atoms of the materials of which said members are composed across said faying surface which will produce a continuous bond between said members and thereby join one member at an angle to the other.

14. A dynamic diffusion bonding type method of joining two or more metallic members into a unitary structure of specified external configuration in which a continuous bond is formed between the members, comprising the steps of:

a. confining said members relative to each other to provide a faying surface therebetween and relative to at least one tooling component configured to match the desired external configuration of the unitary structure on a generally horizontal supporting means distinct from said tooling component, said tooling component extending upwardly relative to said supporting means and having a portion thereof free of contact with at least one of the members being joined;

b. providing a rotatable electrode on the opposite side of the faying surface between the members to be joined from said supporting means and in contact with one of said members;

c. exerting a localized pressure on successive increments of said members by biasing said electrode toward the member contacted thereby and concomitantly effecting relative movement between the members and the rotatable electrode;

d. simultaneously with the exertion of said localized pressure, locally heating the portions of the members contiguous to said line of contact between the electrode and the member contacted thereby by passing an electrical current from said electrode through the members being joined to the supporting means; and e. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to cause said material to flow into contact with and to assume the configuration of the tooling component and to insure essentially complete metal-to-metal contact between said members along said faying surface and thereby permit a diffusion of atoms of the materials of which said materials are composed across said faying surface which will produce a continuous bond between said members.

15. A dynamic diffusion bonding type method of joining two or more metallic members into a unitary structure by forming a continuous bond therebetween, comprising the steps of:

a. maintaining the members to be joined in abutting relationship between a supporting means and a rotatable electrode to provide a faying surface therebetween, said electrode and said supporting means being located on opposite sides of the faying surface between the members being joined;

b. exerting a localized pressure on successive increments of said members by biasing said electrode toward the member contacted thereby and concomitantly effecting relative movement between the members and the rotatable electrode;

c. simultaneously with the exertion of said localized pressure, locally heating the portions of the members on which the pressure is exerted by passing an electrical current from said electrode through the members being joined to the supporting means; and d. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to alter the external configuration of the members being joined in the vicinity of the faying surface and to insure essentially complete metal-to-metal contact between said members along said faying surface and thereby permit a diffusion of atoms of the materials of which said members are composed across said faying surface which will produce a continuous bond between said members as the external configuration of the members is altered.

16. A dynamic diffusion bonding-type method of simultaneously joining first and second metallic members to portions of a third member which have different lengths to thereby join said members into a unitary structure by forming continuous bonds therebetween, comprising the steps of:
 a. maintaining said first and second members in abutting relationship to the portions of the third member to which they are to be joined to provide faying surfaces between said first and third and said second and third members, said members being maintained in said abutting relationship between supporting means and first and second rotatable electrodes with one of said electrodes being located on the opposite side of one of said faying surfaces from the supporting means and the other of said electrodes being located on the opposite side of the other of said faying surfaces from said supporting means;
 b. exerting a localized pressure between said first electrode and the member contacted thereby on successive increments of said first and third members by biasing said electrode toward the member contacted thereby and concomitantly effecting relative movement between the members and the rotatable electrode;
 c. exerting a localized pressure between said second electrode and the member contacted thereby on successive increments of said second and third members by biasing said second electrode toward the member contacted thereby and concomitantly effecting relative movement between the members and the rotatable electrode;
 d. driving said first and second electrodes at different speeds so selected that the surface speed of each electrode is substantially equal to the surface speed of the member against which it is biased;
 e. simultaneously with the exertion of said localized pressures, locally heating the portions of the members on which pressure is exerted by passing electrical currents from said electrodes through the members being joined to the supporting means; and
 f. so regulating the current density through the members being joined as to maintain the maximum temperature of each of said members below the melting point of the material of which said member is composed and thereby prevent melting of the members but high enough to exceed the yield stress of the material from which each said member is fabricated at the pressures exerted by the electrodes in regions contiguous to the faying surfaces and opposite the lines of contact between the electrodes and the members contacted thereby to thereby produce sufficient localized plastic flow of each of the members being joined to insure essentially complete metal-to-metal contact between said members along said faying surfaces and thereby permit a diffusion of atoms of the materials of which said members are composed across each of said faying surfaces which will produce a continuous bond between said members.

17. A dynamic diffusion bonding-type method of joining two or more metallic members into a unitary structure by forming a continuous bond therebetween, comprising the steps of:
 a. maintaining the members to be joined in abutting relationship between a supporting means and a rotatable electrode to provide a faying surface therebetween, said electrode and said supporting means being located on opposite sides of the faying surface between the members being joined and said members being maintained in said abutting relationship by assembling to at least one of the members being joined tooling so configured as to maintain the member to be joined to said one member in said abutting relationship thereto;
 b. exerting a localized pressure on successive increments of said members by biasing said electrode toward the member contacted thereby and concomitantly effecting relative movement between the members and the rotatable electrode;
 c. simultaneously with the exertion of said localized pressure, locally heating the portions of the members on which the pressure is exerted by passing an electrical current from said electrode through the members being joined to the supporting means; and
 d. so regulating the current density through the members being joined as to maintain the maximum temperature of each of said members below the melting point of the material of which said member is composed and thereby prevent melting of the members but high enough to exceed the yield stress of the material from which each said member is fabricated at the pressure exerted by the electrode in a region contiguous to the faying surface and opposite the line of contact between the electrode and the member contacted thereby to thereby produce sufficient localized plastic flow of each of the members being joined to insure essentially complete metal-to-metal contact between said members along said faying surface and thereby permit a diffusion of atoms of the materials of which said members are composed across said faying surface which will produce a continuous bond between said members; and
 e. removing the tooling by which the members being joined were maintained in said abutting relationship.

* * * * *

UNITED STATES PATENT OFFICE
CERTIFICATE OF CORRECTION

Patent No. 3,644,698                    Dated February 22, 1972

Inventor(s) Arthur G. Metcalfe and Fred K. Rose

It is certified that error appears in the above-identified patent and that said Letters Patent are hereby corrected as shown below:

Column 3, lines 21 and 22, change the formula to read --Ti-6Al-6V-2Sn--.

Column 3, line 33, change "by" to --be--.

Column 4, line 32, after "that" delete the word "the".

Column 4, line 69, change "binding" to --bonding--.

Column 5, line 28, change "binding" to --bonding--.

Column 6, line 3, after "or" insert --at--.

Column 6, line 12, change "binding" to --bonding--.

Column 6, line 42, change ":" to --;--.

Column 6, line 61, after "along" delete --the--

Column 9, line 13, change the formula to --Ti-6Al-4V--.

Column 9, line 15, change "material" to --materials--.

Column 10, line 1, change the formula to --Ti-6Al-4V--.

Column 10, line 12, change the formula to --Ti-6Al-4V--.

Column 12, line 23, change "LPAC-3-408-207" to --LPAC-3-480-207·

Column 13, lines 62 and 63, change the formula to

--Ni-19Cr-18Fe-5Cb-3Mo-0.8Ti-0.6Al--.

UNITED STATES PATENT OFFICE
CERTIFICATE OF CORRECTION

Patent No. 3,644,698    Dated February 22, 1972

Inventor(s) Arthur G. Metcalfe and Fred K. Rose

It is certified that error appears in the above-identified patent and that said Letters Patent are hereby corrected as shown below:

Page 2

Column 15, line 1, change "EXAMPLE thick" to --EXAMPLE V--.

Column 15, line 6, change "tick" to --thick--.

Column 15, line 62, after "44" insert --inch--.

Signed and sealed this 17th day of April 1973.

(SEAL)
Attest:

EDWARD M. FLETCHER, JR.
Attesting Officer

ROBERT GOTTSCHALK
Commissioner of Patents